(12) United States Patent
Peddada et al.

(10) Patent No.: US 12,418,405 B2
(45) Date of Patent: Sep. 16, 2025

(54) PROTECTING APPLICATION PRIVATE KEYS WITH REMOTE AND LOCAL SECURITY CONTROLLERS

(71) Applicant: salesforce.com, inc., San Francisco, CA (US)

(72) Inventors: Prasad Peddada, Alameda, CA (US); Taher Elgamal, Atherton, CA (US)

(73) Assignee: Salesforce, Inc., San Francisco, CA (US)

( * ) Notice: Subject to any disclaimer, the term of this patent is extended or adjusted under 35 U.S.C. 154(b) by 638 days.

(21) Appl. No.: 17/649,547

(22) Filed: Jan. 31, 2022

(65) Prior Publication Data

US 2023/0126356 A1   Apr. 27, 2023

Related U.S. Application Data

(60) Provisional application No. 63/279,493, filed on Nov. 15, 2021, provisional application No. 63/272,533, filed on Oct. 27, 2021.

(51) Int. Cl.
*H04L 9/08* (2006.01)
*H04L 9/32* (2006.01)

(52) U.S. Cl.
CPC .......... *H04L 9/0825* (2013.01); *H04L 9/0841* (2013.01); *H04L 9/085* (2013.01);
(Continued)

(58) Field of Classification Search
CPC ..... H04L 9/085; H04L 9/0825; H04L 9/0841; H04L 9/0894; H04L 9/3213;
(Continued)

(56) References Cited

U.S. PATENT DOCUMENTS

| 2008/0172730 | A1 | 7/2008 | Sandhu | |
|---|---|---|---|---|
| 2010/0100724 | A1* | 4/2010 | Kaliski, Jr. | H04L 9/3226 713/171 |
| 2011/0158411 | A1* | 6/2011 | Medvinsky | H04N 21/26613 380/279 |
| 2016/0094531 | A1 | 3/2016 | Unnikrishnan | |

(Continued)

FOREIGN PATENT DOCUMENTS

| EP | 3496331 A1 | 6/2019 | |
|---|---|---|---|
| WO | WO-2019105571 A1 * | 6/2019 | ......... H04L 63/0442 |

OTHER PUBLICATIONS

Yehuda Lindelly, et al., "Fast Secure Multiparty ECDSA with Practical Distributed Key Generation and Applications to Cryptocurrency Custody," Oct. 14, 2018, pp. 1-50, CCS '18: Proceedings of the 2018 ACM SIGSAC Conference on Computer and Communications Security.

*Primary Examiner* — Jung W Kim
*Assistant Examiner* — James P Moles
(74) *Attorney, Agent, or Firm* — Kowert, Hood, Munyon, Rankin & Goetzel, P.C.; Paul T. Seegers; Dean M. Munyon

(57) ABSTRACT

A remote security controller (RSC) generates a private key for a client application on a different host computing device and splits the private key into a first fragment and a second fragment. The first fragment, but not the second fragment, is encrypted using a symmetric key. The split private key is returned to the different host computing device. A local security controller (LSC) on the different host computing device is able to derive the symmetric key using a key agreement protocol with the RSC. When the client application needs to digitally sign a data value with the split private key, the client application generates a first partial Multiparty Computation (MPC) signature using the second fragment. The LSC generates a second partial MPC signature with the first fragment, which has been decrypted using the symmet- (Continued)

ric key. The first and second partial MPC signatures are combinable to digitally sign the data value.

20 Claims, 29 Drawing Sheets

(52) U.S. Cl.
CPC .......... *H04L 9/0894* (2013.01); *H04L 9/3213* (2013.01); *H04L 9/3247* (2013.01); *H04L 9/3263* (2013.01); *H04L 2209/46* (2013.01)

(58) Field of Classification Search
CPC ... H04L 9/3247; H04L 9/3263; H04L 9/0891; H04L 9/0897; H04L 9/14; H04L 9/0822; H04L 9/3268; H04L 2209/46
See application file for complete search history.

(56) References Cited

U.S. PATENT DOCUMENTS

| | | |
|---|---|---|
| 2016/0191253 A1 | 6/2016 | Pyle |
| 2017/0214662 A1 | 7/2017 | Chu |
| 2017/0373844 A1* | 12/2017 | Sykora .................... H04L 9/006 |
| 2019/0245857 A1* | 8/2019 | Pe'Er ........................ H04L 9/30 |
| 2019/0260582 A1 | 8/2019 | Norum |
| 2020/0044862 A1 | 2/2020 | Yadlin et al. |
| 2020/0044863 A1 | 2/2020 | Yadlin et al. |
| 2020/0169410 A1 | 5/2020 | Wainblat |
| 2020/0252382 A1* | 8/2020 | Peddada, IV ......... H04L 9/3271 |
| 2022/0201091 A1 | 6/2022 | Ross |
| 2023/0104126 A1* | 4/2023 | So ......................... H04L 9/3268 |
| | | 713/156 |
| 2023/0299942 A1 | 9/2023 | Be'Ery |
| 2023/0344643 A1 | 10/2023 | Priisalu |
| 2024/0031133 A1* | 1/2024 | Cameron ............ H04L 63/0442 |

* cited by examiner

```
                                            ┌─ 240
``` receiving, at a security controller executing on at least a first computer system, a request from a client application to use a split private key to digitally sign a data value, the private key including a first fragment and a second fragment, where the first fragment, but not the second fragment, is encrypted by a symmetric key that is accessible to the security controller but not to the client application

245 using, by the security controller, a decrypted version of the first fragment to perform a first Multiparty Computation (MPC) cryptographic operation to generate a first partial output, where the client application is executable to use the second fragment to perform a second MPC cryptographic operation to generate a second partial output, the first and second partial outputs being combinable to create a digital signature for the data value on behalf of the client application without the client application having access to the symmetric key

```
                                            ┌─ 260
``` sending, by the client application executing on a computer system, a request to a security controller to use a split private key to digitally sign a data value on behalf of the client application, the split private key having a first fragment and a second fragment, where the first fragment, but not the second fragment, is encrypted by a symmetric key that is accessible to the security controller but not to the client application, and where the security controller is executable to use a decrypted version of the first fragment to perform a first Multiparty Computation (MPC) cryptographic operation to generate a first partial output

265 using, by the client application, the second fragment to perform a second MPC cryptographic operation to generate a second partial output, the first and second partial outputs being combinable to create a digital signature for the data value without the client application having access to the symmetric key

940 receiving, at a security controller executing on a first node and a second node of a computer system, a request from a client application executing remotely on a different node to use a split private key to digitally sign a data value, the private key including a first fragment and a second fragment, where the first fragment, but not the second fragment, is encrypted by a symmetric wrapping key that is inaccessible to the client application
945 using, by the security controller, a decrypted version of the first fragment to perform a first Multiparty Computation (MPC) cryptographic operation to generate a first partial output, where the client application is executable to use the second fragment to perform a second MPC cryptographic operation to generate a second partial output, the first and second partial outputs being combinable to create a digital signature for the data value on behalf of the client application without the client application having access to the symmetric wrapping key
950

FIG. 9C

960 sending, by the client application executing on a computer system, a request to a security controller executing remotely on first and second nodes of the computer system to use a split private key to digitally sign a data value on behalf of the client application, the split private key having a first fragment and a second fragment, where the first fragment, but not the second fragment, is encrypted by a symmetric key that is inaccessible to the client application, and where the security controller is executable to use a decrypted version of the first fragment to perform a first Multiparty Computation (MPC) cryptographic operation to generate a first partial output
965 using, by the client application, the second fragment to perform a second MPC cryptographic operation to generate a second partial output, the first and second partial outputs being combinable to create a digital signature for the data value without the client application having access to the symmetric key
970

FIG. 9D

PROTECTING APPLICATION PRIVATE KEYS WITH REMOTE AND LOCAL SECURITY CONTROLLERS

CROSS-REFERENCE TO RELATED APPLICATIONS

The present application claims priority to U.S. Prov. Appl. No. 63/272,533, filed Oct. 27, 2021, and U.S. Prov. Appl. No. 63/279,493, filed Nov. 15, 2021, both of which are incorporated by reference herein in their entireties.

The present application is also related to the following co-pending U.S. applications, both filed Jan. 31, 2022: U.S. application Ser. No. 17/649,546 entitled "Protecting Application Private Keys Using MPC Techniques", and U.S. application Ser. No. 17/649,549 entitled "Protecting Application Private Keys with Remote and Local Security Controllers and Local MPC Key Generation". Both of these applications also hereby incorporated by reference herein in their entireties.

BACKGROUND

Technical Field

This disclosure is generally directed to the field of computer security, and more particularly, to the secure generation and usage of private keys.

Description of Related Art

One common method of authentication in computer systems is based on asymmetric cryptography, in which public and private keys of a key pair are created for a key user such as a client application. An entity may sign data with its private key, which may then be verified by another party using the entity's known public key. Possession of a private key is proof of the application's identity; accordingly, private keys need to be stored and handled carefully, and thus not distributed. Public key cryptography is used in a variety of settings, including Transport Layer Security (TLS), which is a widely adopted security protocol designed to facilitate privacy and data security for communications over the Internet. A primary use case of TLS is encrypting the communication between web applications and servers, such as web browsers loading a website.

In some computing environments (e.g., enterprise software), there may be many entities within the system that need to use asymmetric cryptography. In certain situations, private keys for system client applications may be stored in the clear (i.e., not encrypted), and therefore may undesirably be accessible to many different entities. This accessibility increases the potential for a client application's private key to be misappropriated.

BRIEF DESCRIPTION OF THE DRAWINGS

The following detailed description makes reference to the accompanying drawings, which are now briefly described.

FIG. 2C is a flow diagram of one embodiment of a method performed by a security controller for using a split private key to digitally sign a data value.

FIG. 2D is a flow diagram of one embodiment of a method performed by a client application for using a split private key to digitally sign a data value.

FIG. 9C is a flow diagram of one embodiment of a method performed by a multi-node security controller for using a split private key to digitally sign a data value in conjunction with a client application.

FIG. 9D is a flow diagram of one embodiment of a method performed by a client application for using a split private key to digitally sign a data value in conjunction with a multi-node security controller.

DETAILED DESCRIPTION OF EMBODIMENTS

Figure 1A:
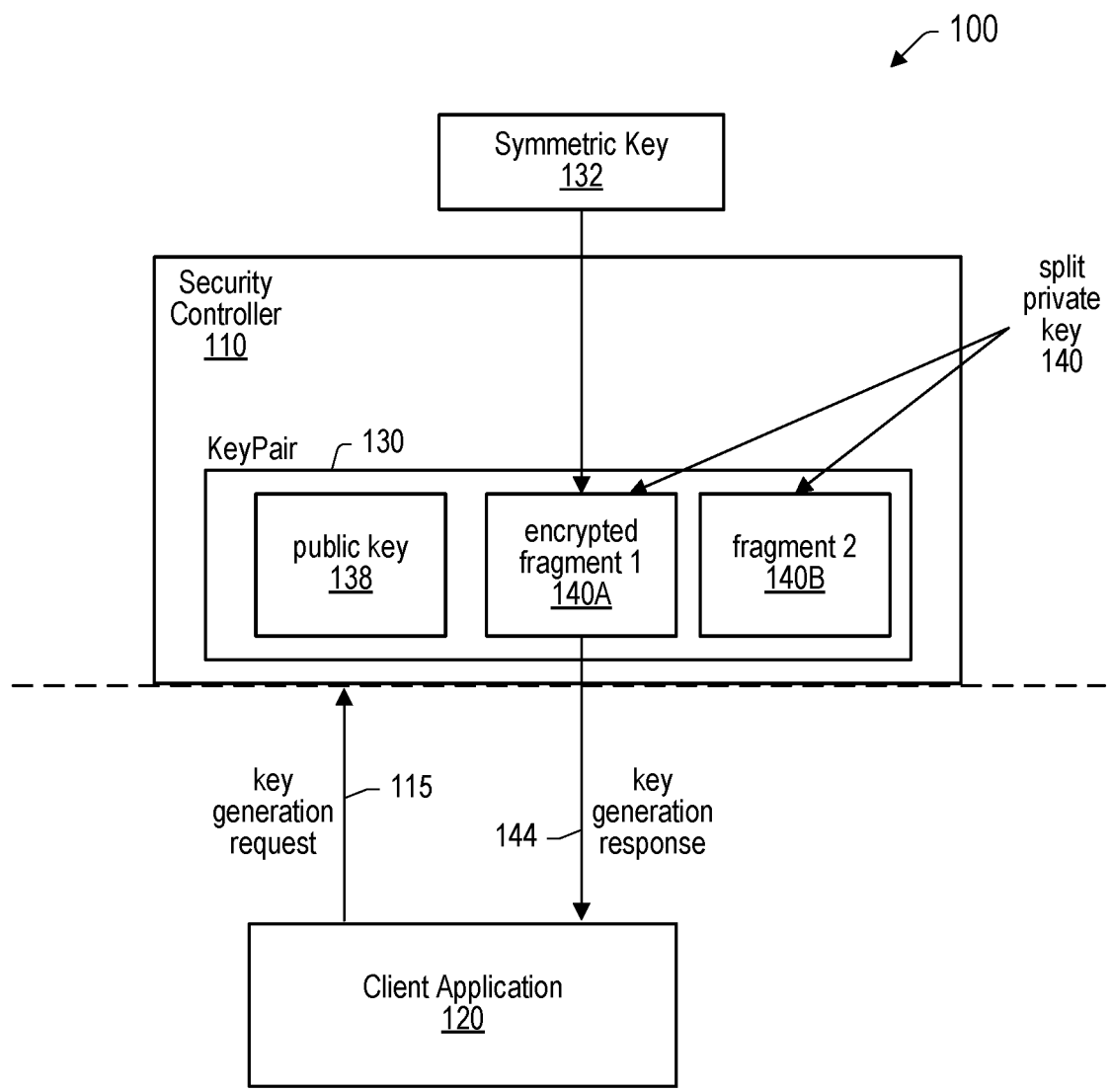
FIG. 1A is a block diagram of one embodiment of a system configured to generate and distribute a split private key to a client application.

Consider a scenario in which a client application is seeking authentication from an entity and receives a challenge as part of a challenge-response scenario. The client application will sign a data value in the challenge with its private key, and the entity will then attempt to verify the signature with the client application's public key to see if the signature is valid. But because there is the possibility of the client application's key having been compromised, a second authentication factor may be used. For example, outside the context of the cryptographic process, the client application's IP address may be checked (e.g., using an IP allow list) to determine if the authentication request is coming from an expected location.

While such an approach may be helpful in terms of security, it suffers from scalability problems. In a high-volume context, for example, consider an environment with multiple data centers, multiple containers per service, and a large number of services. In this type of setting, use of an IP-allow list would incur significant operational overhead and suffer from scalability issues.

The inventors have realized that using techniques in a subfield of cryptography known as secure Multiparty Computation (MPC) may result in increased security for protecting private keys to a degree that makes it practical, if desired, to forgo the use of a second authentication factor that is performed outside a cryptographic protocol. (For example, an IP allow list that is checked separately from cryptographic operations could be skipped if desired.) MPC permits parties to jointly compute a function over their inputs while keeping those inputs private. A classic example that may be solved by MPC is the Millionaires' Problem: two millionaires X and Y want to know who is richer, in such a way that neither of them learns the net worth of the other. An MPC solution to this problem might involve securely evaluating the comparison function F=max (salaryX, salaryY).

Informally speaking, the most basic properties that a MPC protocol aims to ensure are as follows:

Input privacy: No information about the private data held by the parties can be inferred from the messages sent during the execution of the protocol. The only information that can be inferred about the private data is whatever could be inferred from seeing the output of the function alone.

Correctness: Any proper subset of adversarial colluding parties willing to share information or deviate from the instructions during the protocol execution should not be able to force honest parties to output an incorrect result.

Thus, unlike traditional cryptographic tasks, where cryptography assures security and integrity of communication or storage and the adversary is outside the system of participants (an eavesdropper on the sender and receiver), the cryptography in this model protects participants' privacy from one another.

Accordingly, the problem of attaining scalability of private key authentication requests is proposed to be solved by using MPC techniques to generate and use private keys. For example, in response to a request from a client application to generate public and private keys, a security controller can generate the keys, split the private key into 1) a first fragment that is encrypted by a symmetric key accessible by the security controller but not the client application, and 2) a second fragment that is unencrypted. A key package that includes the encrypted fragment is then returned to the client application. Subsequently, when the client application needs to use the private key (e.g., in order to sign a data value as part of a challenge-response), MPC techniques can be employed in tandem by the client and security controller. For example, the client application can compute a first partial MPC result from the unencrypted second fragment. The client application can then pass the key package back to the security controller, allowing the controller to decrypt the first fragment and use the results to compute a second partial MPC result, which is then returned to the client application. The first and second partial MPC results can thus be combined to form a final signature.

This paradigm has several potential advantages, including moving away from IP-based network protections (thus leading to greater scalability), increased life of certificates used to manage the private keys (the more robust protection provided by this paradigm allows certificates to last longer), and better security because of less lateral movement from a compromised system component.

While the techniques disclosed herein are broadly applicable, they may be particularly useful in a public cloud environment, since these techniques scale well (more instances of the security controller can be added to handle larger loads) and afford high availability, since one or more security controllers can be lost without impacting the ability of the remaining controllers to service requests. In one setting, the techniques may be used within a functional domain (FD), which is a logical grouping of services delivered as one unit. In such embodiments, a new security controller may be deployed in each functional domain, wherein the controller has no external dependencies. In one embodiment, the security controller is stateless in nature, and multiple identical copies may be deployed to achieve availability and scale in order to satisfy all client application requests. As such, each security controller may be capable of supporting all requests that might be made in the functional domain. As used herein, a "client application" refers broadly to a software entity that uses a key pair to perform cryptographic operations, and may refer generally to any type of application, container, service, etc. The application is considered to be a "client" relative to the "security controller," which is a program that provides functionality that generates key pairs for client applications and/or permits client applications to use keys to perform digital signatures. The security controller can act as a certificate authority in some implementations.

Split Private Keys

FIG. 1A is a block diagram of one embodiment of a system 100 configured to generate and distribute a split private key to a client application. As shown, system 100 includes a security controller 110 and client application 120, which are both programs executing on computer systems within system 100, which in one embodiment is an enterprise computer system. As will be described, security controller 110 may be implemented as multiple nodes, or distinct sets of program instructions that operate independently. For example, a single server blade might host multiple nodes, all of which operate independently of one another. In some embodiments, these multiple nodes may execute on a different host computing device than the one on which client application 120 is executing. In other embodiments, a first node of security controller 110 can execute on a different host computing device than a second node, which may also be the host computing device on which client application 120 is executing.

FIG. 1A depicts a key generation, or provisioning, process. As shown, client application 120 initiates a key generation request 115, thereby requesting generation of a key pair that includes a public key and a private key. The key pair may then be used to perform various operations based on public-key cryptography. In particular, client application 120 may use the private key portion of the key pair to authenticate itself to other computing devices within system 100.

In response to key generation request 115, security controller 110 executes to generate key pair 130, which includes a public key 138 and a private key. Security controller 110 then splits the private key into two or more fragments, creating split private key 140. In the embodiment shown in FIG. 1A, split private key 140 includes fragments 140A and 140B, but in other embodiments, three or more fragments may be utilized. Security controller 110 uses a symmetric key 132 to encrypt fragment 140A but not 140B. Symmetric key 132 is a cryptographic key that is accessible or available to at least a portion of security controller 110, but is not accessible or available to client application 120 (hence the dashed line shown in FIG. 1A, which illustrates the boundaries of the usage of symmetric key 132). For example, symmetric key 132 may be stored by a particular node of security controller 110 (possibly in a short-lived cache).

In various embodiments, symmetric key 132 is generated by a key agreement protocol such as a Diffie-Hellman technique. One type of Diffie-Hellman exchange is based on elliptic-curve cryptography, and is called elliptic-curve Diffie-Hellman, or ECDH. In various embodiments, the key agreement protocol may be performed between various parties, including two different nodes of the security controller, the client application and a node of the security controller, etc. (References in this disclosure to a "key agreement protocol" also include the use of a key agreement protocol followed by a key derivation function (KDF) such as HKDF, in which the secret for KDF is the output of the key agreement.)

Responsive to key generation request 115, security controller produces a key generation response 144. Response 144 may include various items in different embodiments, such as a certificate with the public key of key pair 130, and fragments 140A and 140B. The general idea of the approach exemplified by FIG. 1A is that no single node (e.g., client application 120, or any of the one or more nodes of security controller 110) will have access to the entirety of private key 140 in the clear, thereby improving security. Different implementations of this approach are described throughout this disclosure. (Note that the contents or payload of key generation response may be encrypted and subsequently decrypted by client application 120. But after this payload decryption, fragment 140A still remains encrypted using symmetric key 132, whereas fragment 140B is now unencrypted.)

As will be described next with respect to FIG. 1B, MPC techniques may be employed to use the split private key to sign a data value on behalf of client application 120 without application 120 having access to an unencrypted version of fragment 140A. Public-key cryptography allows an entity such as client application 120 to authenticate itself to another entity (shown here as authenticating entity 170). In general, this authentication is performed using a challenge-response paradigm.

Client application 120 begins this process by making authentication request 150 to authenticating entity 170, which is some other program running within system 100. Request 150 may include, for example, a certificate of client application 120, which includes the public key portion of key pair 130 and has been generated and signed by another entity acting as a certificate authority (CA) (e.g., security controller 110). The CA will typically hash information to be included in the certificate, and then generate a signature for the certificate by signing the hash with the private key of the CA.

Entity 170 will typically use information in the certificate to verify that the certificate is indeed for the client application. For example, entity 170 may generate a hash of information included in the certificate, and then verify the signed hash using the CA's public key. If the generated hash and the verified hash match, entity 170 can assume that the authentication request is from an entity that has a valid copy of client application 120's certificate.

The next step, from the perspective of authenticating entity 170, is to verify that client application 120 is in possession of the private key that corresponds to the public key included in the certificate. This is commonly done using a challenge-response technique. Entity 170 issues a challenge 152 to client application 120. For example, challenge 152 may include a data value (often called a "nonce"). The idea is that client application 120 will sign the data value with its private key. Entity 170 will then verify the signed data value with the client application's public key, and compare it to the original data value. If the two values match, client application 120 can be considered to be authenticated to entity 170.

Figure 1B:
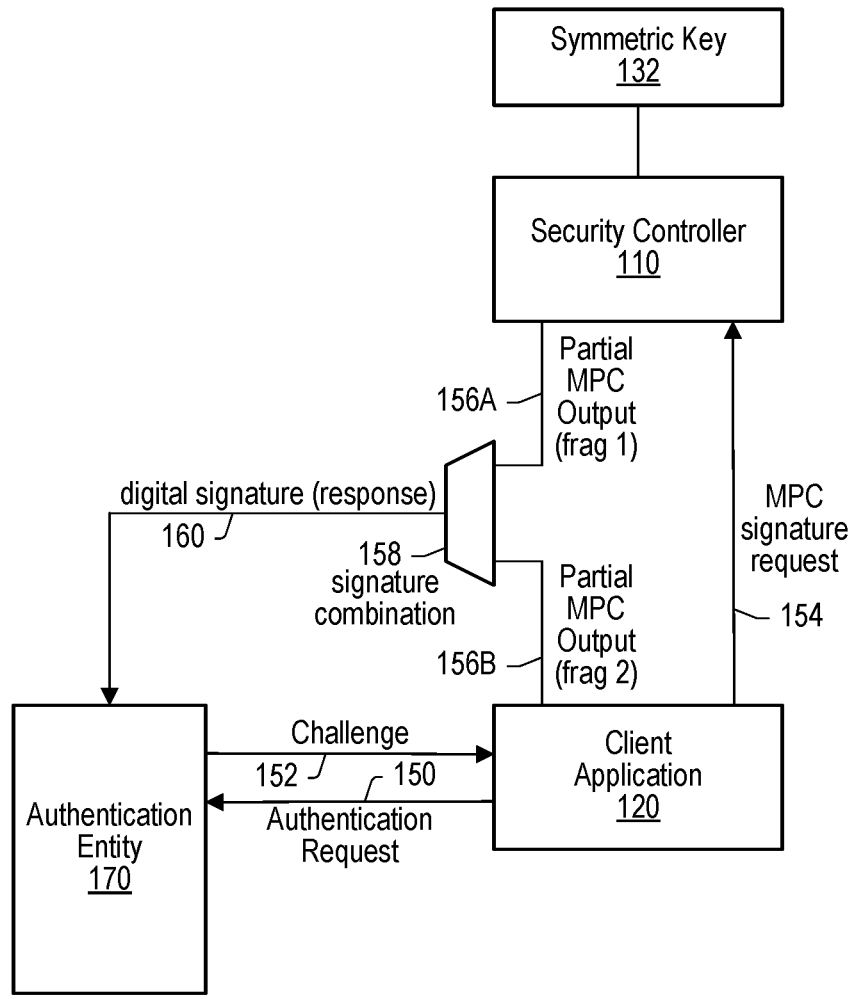
FIG. 1B is a block diagram of one embodiment of a system configured to use a split private key to digitally sign a data value.

The way that challenge-response operates in FIG. 1B is that client application 120 and security controller 110 work together using MPC techniques to generate a digital signature. In one embodiment, client application 120, after the key generation request, may have fragments 140A and 140B of its private key, but it does not have access to symmetric key 132 used to encrypt fragment 140A. Accordingly, client application 120 may send an MPC signature request 154 to security controller 110, which causes security controller 110 to perform a first MPC cryptographic operation to generate a first partial MPC output 156A. Output 156A is a partial signature of the data value to be signed. Because symmetric key 132 is accessible/available to security controller 110, fragment 140A may be decrypted and the decrypted version may be used to generate output 156A. In one implementation, request 154 from client application 120 actually includes encrypted fragment 140A, which means that security controller 110 can be stateless (i.e., controller 110 does not have to retain any information about the private keys of client applications between signature requests). In other embodiments, security controller 110 could store the encrypted fragments for various client applications, but would then need to determine the correct fragment to utilize upon receiving a signature request.

Client application 120, in turn, uses the other fragment of private key 140 (i.e., fragment 140B) to perform a second MPC cryptographic operation to generate a second partial MPC output 156B that is also a partial signature of the data value to be signed. Note that outputs 156A and 156B may be generated in any particular order (e.g., 156A is generated first, 156B is generated first, 156A and 156B are generated concurrently). Once partial outputs 156 have been generated (in whatever order), the results are combined to generate a digital signature 160 for the data value. Digital signature 160 is the data value supplied in challenge 152. Significantly, this signature occurs without client application 120 ever having access to an entirety of private key 140 in the clear in order to produce signatures by itself.

This functionality for generating digital signature 160 is represented logically in FIG. 1B by signature combination module 158. This functionality can reside in various places. In one implementation, client application 120 may send output 156B to security controller 110, which includes module 158 and outputs digital signature 160. Alternatively, module 158 may reside in client application 120, and create digital signature 160 after receiving output 156A from security controller 110 in response to MPC signature request 154. In another implementation, module 158 could reside outside both security controller 110 and client application 120.

Wherever digital signature 160 is computed, it is conveyed to authenticating entity 170. Entity 170 can then verify the received data value using the public key of client application 120. If the signature can be verified with the public key of client application 120, client application 120 can be considered to be authenticated to entity 170. Client application 120 has not only presented a certificate issued by a CA, but has proven that it is in possession of the private key that corresponds to the public key in the certificate. But unlike approaches in which client application 120 has access to an entirety of private key 140 in the clear, here security is improved. Even if client application 120 were compromised by a malicious entity, that entity would still not have access to fragment 140A in the clear.

Figure 2A:
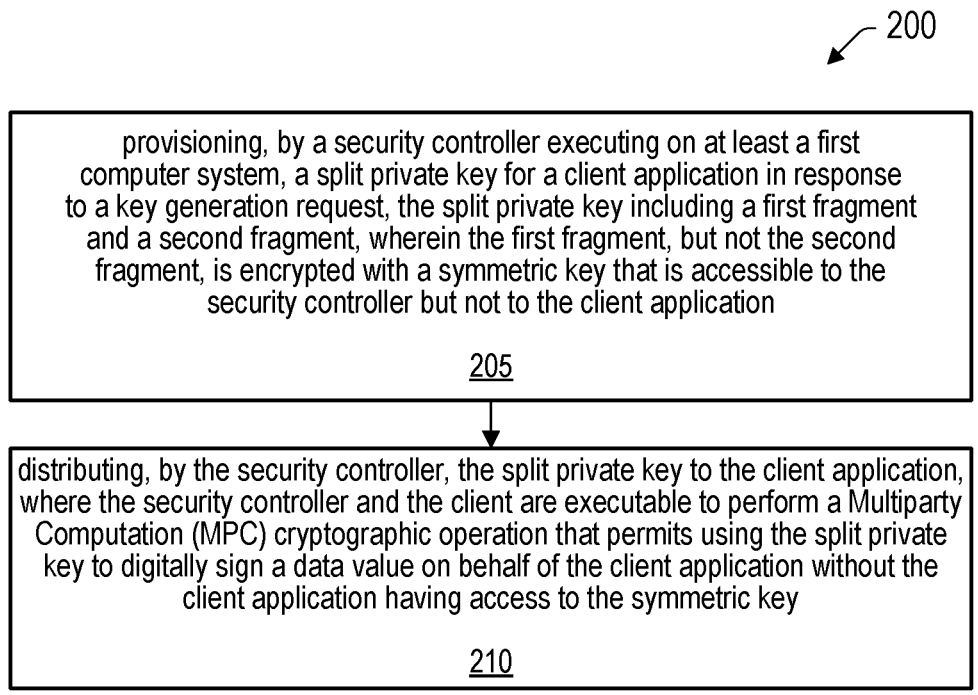
FIG. 2A is a flow diagram of one embodiment of a method performed by a security controller for generating and distributing a split private key to a client application.
Figure 2B:
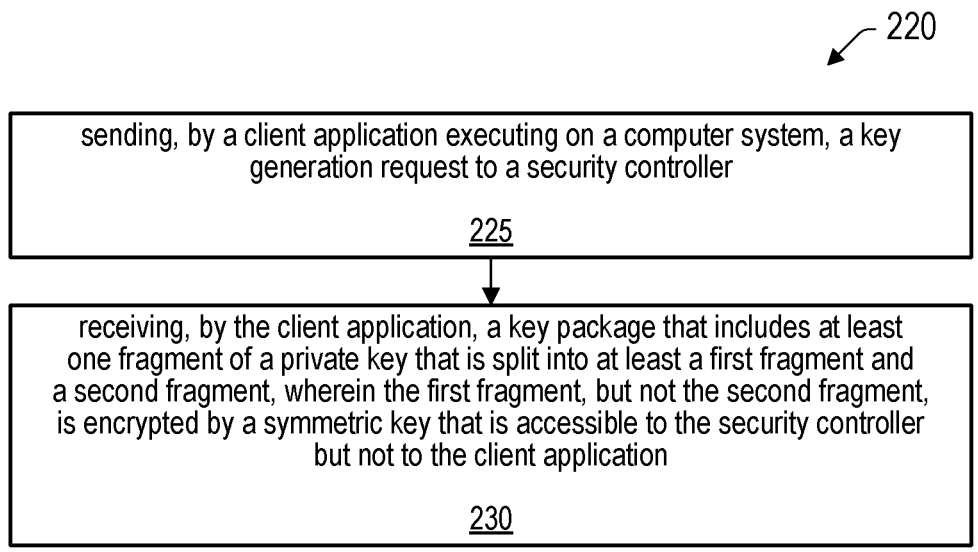
FIG. 2B is a flow diagram of one embodiment of a method performed by a client application for requesting a split private key from a security controller.

Operations associated with the systems of FIGS. 1A-B are now summarized with respect to FIGS. 2A-D. FIGS. 2A-B are directed to the key generation process, while FIGS. 2C-D are directed to the key usage (signature) process. FIGS. 2A and 2C are from the perspective of the security controller, while FIGS. 2B and 2D are from the perspective of the client application.

FIG. 2A is a flow diagram of one embodiment of a method 200 performed by a security controller for generating and distributing a split private key to a client application.

Method 200 begins in 205, in which a security controller executing on at least a first computer system generates a split private key for a client application in response to a key generation request. (As will be described below, in some embodiments, the security controller may execute on two different host computing devices.) The split private key for the client application includes a first fragment and a second fragment; the first fragment, but not the second fragment, is encrypted with a symmetric key accessible to the security controller but not to the client application.

In 210, the security controller distributes the split private key to the client application. The generation of this split private key allows the client application to subsequently use the split private key. More specifically, the security controller and client application are coded with program instructions making them executable to perform a Multiparty Computation (MPC) cryptographic operation that permits using the split private key to digitally sign a data value on behalf of the client application without the client application having access to the symmetric key, as will be described next with reference to FIG. 2B.

FIG. 2B is a flow diagram of one embodiment of a method 220 performed by a client application for requesting a split private key from a security controller. In 225, a client application executing on a computer system sends a key generation request to a security controller. In 230, the client application receives, from the security controller in response to the key generation request, a key package that includes at least one fragment of a private key for the client application. The private key is split into at least a first fragment and a second fragment. The first fragment, but not the second fragment, is encrypted by a symmetric key that is accessible to the security controller but not to the client application.

As will be described below, in some implementations, the client application receives the entirety of the split private key. But the client application does not have access to the entirety of the private key in the clear, because, unlike the security controller, it does not have access to the symmetric key. In other implementations, the client application might receive only a portion of the split private key, such as a fragment not encrypted by the symmetric key. In such implementations, the security controller might retain the encrypted fragment of the split private key, for use in subsequent key usage. Methods for use of a split private key, from the perspective of both the security controller and the client application, are now described with respect to FIGS. 2C-D.

FIG. 2C is a flow diagram of one embodiment of a method 240 performed by a security controller for using a split private key to digitally sign a data value.

Method 240 begins in 245, in which a security controller executing on at least a first computer system receives a request from a client application to use a split private key to digitally sign a data value. The split private key includes a first fragment and a second fragment. The first fragment, but not the second fragment, is encrypted by a symmetric key that is accessible to the security controller but not to the client application.

In 250, the security controller uses a decrypted version of the first fragment to perform a first Multiparty Computation (MPC) cryptographic operation to generate a first partial output. The client application from which the security controller receives the request is executable to use the second fragment to perform a second MPC cryptographic operation to generate a second partial output. The first and second partial outputs are combinable to create a digital signature for the data value on behalf of the client application without the client application having access to the symmetric key.

As has been noted, the first and second MPC cryptographic operations may be performed in any order. Further, the combining of the first and second partial outputs may be performed by different entities in different implementations. In one implementation, the first and second partial outputs are combined by the client application and used as a digital signature of a response to a challenge from an authenticating entity. In another implementation, the first and second partial outputs may be combined by an application distinct from the client application or security controller (e.g., a container specifically spawned for the purpose of generating an output).

FIG. 2D is a flow diagram of one embodiment of a method 260 performed by a client application for using a split private key to digitally sign a data value. Method 260 is similar to method 240, as the client application and the security controller both act to generate a digital signature for a data value on behalf of the client application. In 265, a client application executing on a computer system sends a request to the security controller to use a split private key to digitally sign a data value, the split private key having a first fragment and a second fragment. The first fragment, but not the second fragment, is encrypted by a symmetric key that is accessible to the security controller but not to the client application. The security controller is executable to use a decrypted version of the first fragment to perform a first Multiparty Computation (MPC) cryptographic operation to generate a first partial output.

In 270, the client application uses the second fragment to perform a second MPC cryptographic operation to generate a second partial output. The first and second partial outputs are combinable to create a digital signature for the data value without the client application having access to the symmetric key. Some variations of method 260 thus include the client application combining the first and second partial outputs to generate the digital signature.

FIGS. 1 and 2 have been used to describe a paradigm in which two programs—a security controller and a client application—generate and utilize a split private key for the client application. Only a portion of the split private key is available in the clear to the client application, thus increasing security of the private key. The next two sections provide specific implementations of this paradigm. The next section (entitled "Remote, Multi-Node Security Controller") describes an approach in which the security controller has multiple nodes that are implemented on a different host computing device than the client application. The subsequent section (entitled "Security Controller with Remote and Local Components") describes an approach in which the security controller has multiple nodes. At least one of the multiple nodes (the local security controller or LSC) is implemented on the same host computing device as the client application, while at least another one of the multiple nodes (the remote security controller or RSC) is implemented on a different host computing device than the client application.

Remote, Multi-Node Security Controller
Key Generation

Figure 3:
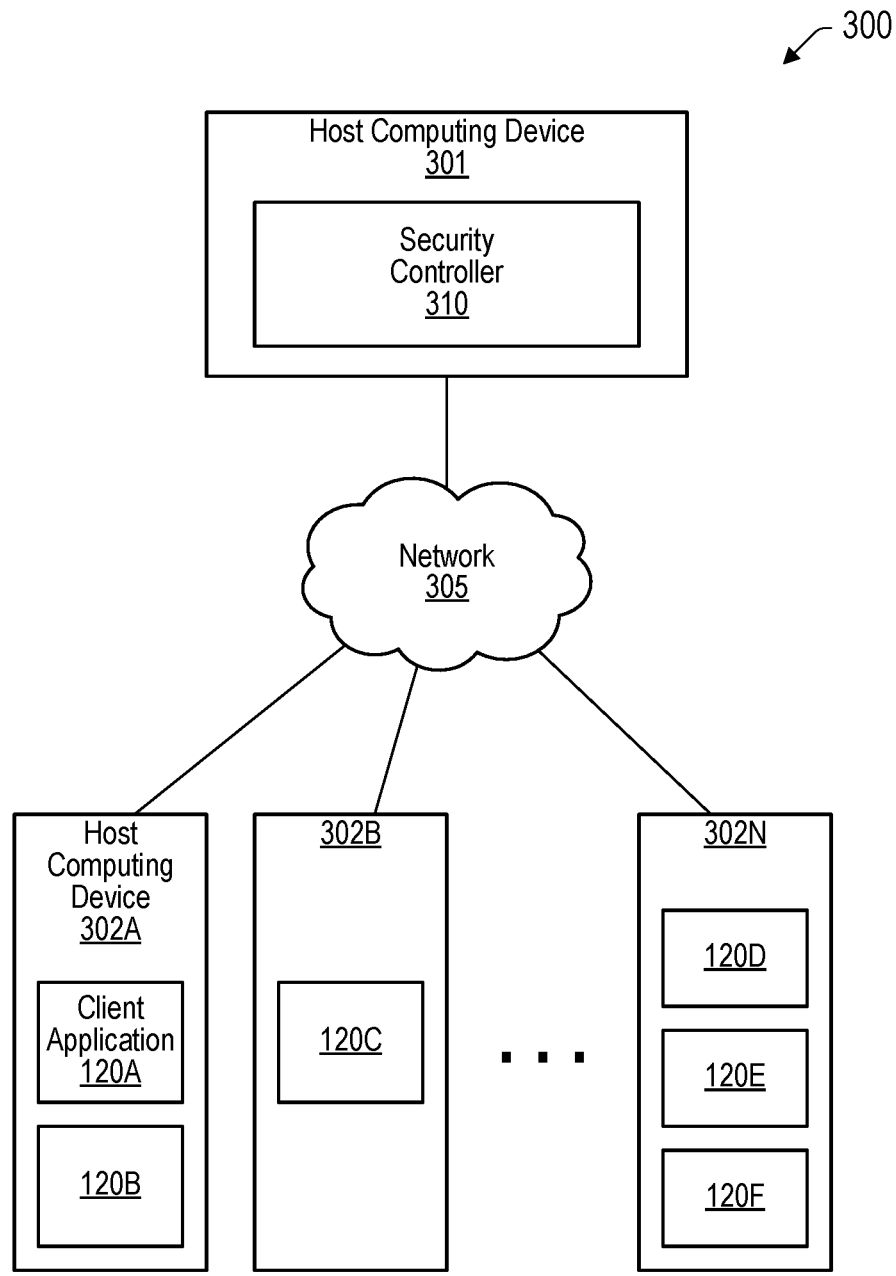
FIG. 3 is a block diagram illustrating one embodiment of a security controller coupled to a plurality of host computing devices over a network.

In FIG. 3, a block diagram of one embodiment for implementing an MPC-based solution for key security is depicted. As shown, computer system 300 includes a security controller 310 implemented on a host computing device coupled to a plurality of host computing devices 302A-N over a network 305. Each host computing device 302 may have one or more client applications 120 (e.g., 120A-F), each of which may interact with security controller 310 to provision and use their own, dedicated split keys. As will be described with respect to FIG. 4, security controller 310 may be implemented on two or more different computing nodes. As will also be described, in some embodiments, the block shown as security controller 310 in FIG. 3 may be implemented as a plurality of different security controller instances. Multiple instances may be active at a given time, providing redundancy and scalability for a large number of applications 120 that need to generate and use keys provided by security controller 310.

Host computing devices 301 and 302 can be any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processors or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network 305), or other devices (e.g., graphics, user interface devices, etc.). The host computing device may be coupled to network 305 via any known type of networking technology (e.g., hardwired connection, Wi-Fi, Bluetooth, Ethernet, cellular, etc.).

One common environment for the host computing devices of FIG. 3 is an enterprise computing environment. Thus, a given host computing device might constitute, for instance, a particular blade of a server computer system. A host computing device might be located within a cloud computing environment in some embodiments. Note that FIG. 3 depicts a scenario in which the host computing device hosting security controller 310 is coupled to the host computing device hosting client application 120 via a computer network 305 (i.e., they are not located on the same host computing device). As will be discussed, a given host computing device may implement multiple nodes that perform operations relating to the present disclosure. By design, the nodes communicate certain chosen information with one another, but protected information (e.g., cryptographic resources such as keys) within a given node is not accessible outside that node (i.e., such information is not accessible to another node working in concert with the given node).

Figure 4:
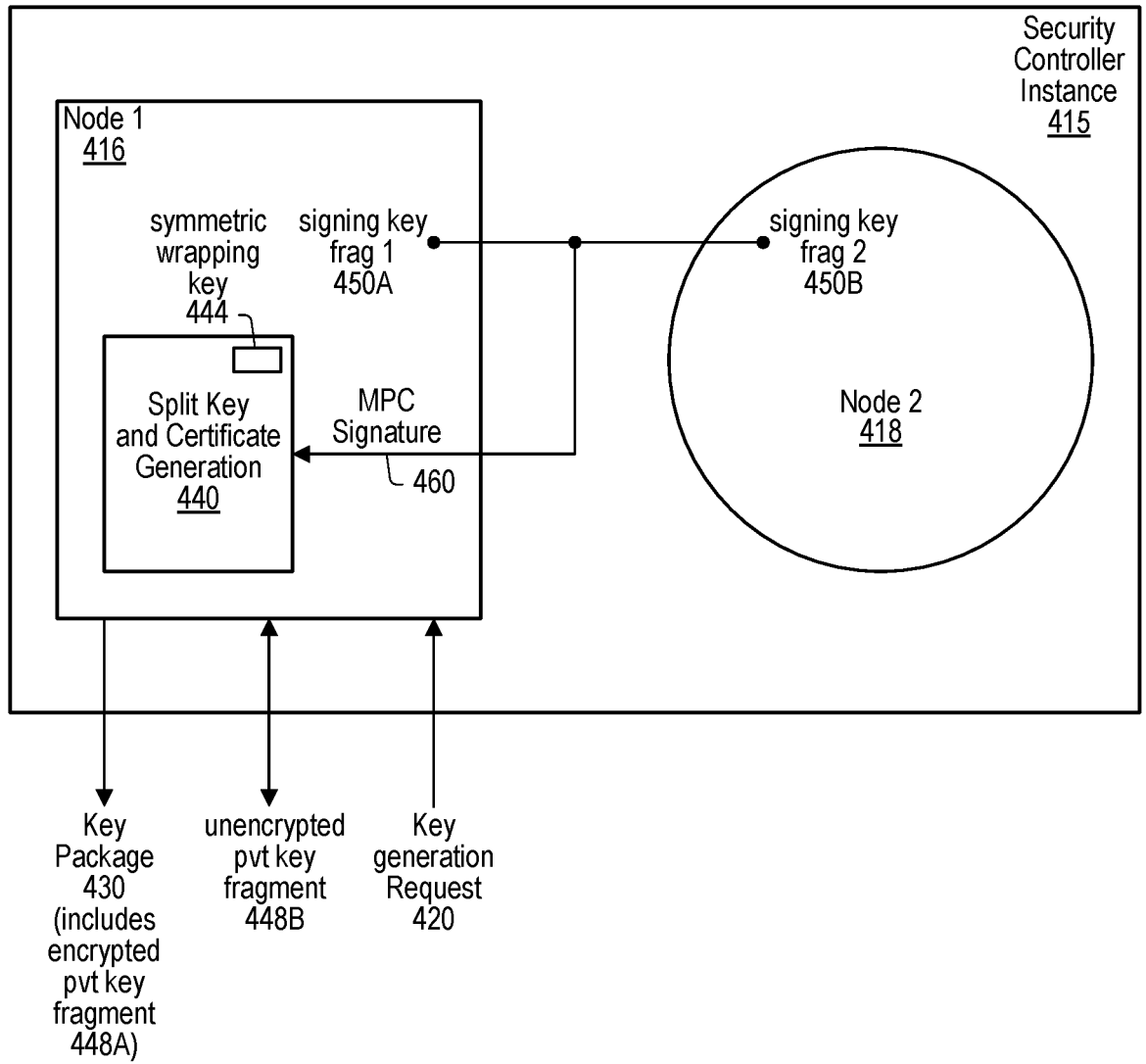
FIG. 4 is a block diagram illustrating components of an instance of a security controller, according to one embodiment.

FIG. 4 is a block diagram of a security controller instance 415. As noted, security controller 310 depicted in FIG. 3 may have one or more security controller instances. As used herein, an "instance" is a copy of the security controller program and associated data, which may run in its own process space, container, etc. As shown, security controller instance 415 has two nodes: node 1 (indicated by reference numeral 416) and node 2 (indicated by reference numeral 418). (A client application—not pictured in FIG. 3—may conceptually be considered to be another node in the key generation and usage processes.) By distributing functionality across these nodes as described below, the integrity of private keys of clients may be preserved even if one of the nodes is compromised. In some embodiments, different nodes may have different degrees of accessibility. For example, node 1 in a given security controller instance might be accessible to client applications and services, but node 2 may only be accessible to node 1, thereby enhancing security.

The key generation process begins with a client application contacting security controller instance 415 with a key generation request 420. In one embodiment, request 420 is indicative of a request for a key pair and a certificate (i.e., request 420 is a Certificate Signing Request (CSR)). The client application may supply various types of metadata in request 420, which instance 415 registers. For example, this metadata may include IP address, service name, host name, and namespace.

As shown, request 420 is received by node 1. Split key and certificate generation module 440 on node 1 is executable to generate a public/private key pair for the client application, along with a corresponding certificate. Module 440 then splits the private key into two or more parts, or fragments. (For ease of reference, this discussion refers to two fragments.)

One of these split private key fragments (448A) is encrypted by a symmetric wrapping key 444 such that this fragment is not ever accessible to the client application in unencrypted form. In one implementation, key 444 is an AES key; other types of symmetric encryption keys may be used as well. The other fragment of the split private key (448B), in contrast, is not encrypted by key 444, and is accessible by the client application in unencrypted form.

The encrypted private key fragment may be considered to be "nondecryptable" from the perspective of the client application; the other fragment is the "decryptable" key fragment. The decryptable key fragment may either be sent to the client in unencrypted form (in which case it is already available to the client in unencrypted form) or may be sent to the client as part of a package that is encrypted in a format that is known to the client (e.g., to prevent a man-in-the-middle attack). In a stateless implementation, both key fragments are sent to the client so the security controller need not to keep track of any information relating to the key. One fragment is decryptable by the client (or already unencrypted), the other is not ultimately decryptable by the client because the key needed to decrypt this fragment remains on the security controller.

In response to request 420, security controller instance 415 constructs a key package 430 (or "key artifact") that includes the certificate (which will in turn include the generated public key), and the encrypted fragment of the private key (reference numeral 448A). The unencrypted fragment of the private key 448B may not be included in the key package in some embodiments. As explained below, key package 430 is subsequently passed back to the security controller instance 415 in order to use the private key to sign data values. Not including the unencrypted private key fragment in the package prevents the security controller from having both halves of the private key during usage of the key. Here, once both private key fragments are generated initially, they do not reside on the same node in a format where they are both readable in the clear by the node. Accordingly, the unencrypted key fragment 448B may be sent to the client application separately from the key package. Stated another way, the security controller might send the client application both a key package and the unencrypted private key fragment, where the key package includes the encrypted private key fragment. This format allows the client application to subsequently send back a key package to security controller instance 415 that does not include both private key fragments.

Security controller instance 415 can hash metadata (such as client identity information like IP address, namespace, etc.), and then sign the hash and the package using a signing private key. (This process is indicated in FIG. 4 by MPC signature operation 460.) In one implementation, the signing private key may be an elliptic curve DSA key (ECDSA) which can, in some cases, be stored solely on node 1 (416). In the depicted embodiment, however, the signing private key is split between nodes 1 and 2 to improve security, such that node 1 has signing private key fragment 1 (450A) and node 2 has signing private key fragment 2 (450B). The signature process may be implemented as an MPC operation, in which each node in security controller instance 415 has only a fragment of the signing private key and the nodes generate the signature for the key package collectively. Dividing the signing key in this manner allows for greater security as a malicious actor would have to compromise multiple nodes in order to access the signing private key. In short, an MPC signature operation 460 may be used to sign key package 430 using signing private key fragments 450A-B. Key package 430 can also be signed without using MPC in some embodiments.

Figure 5:
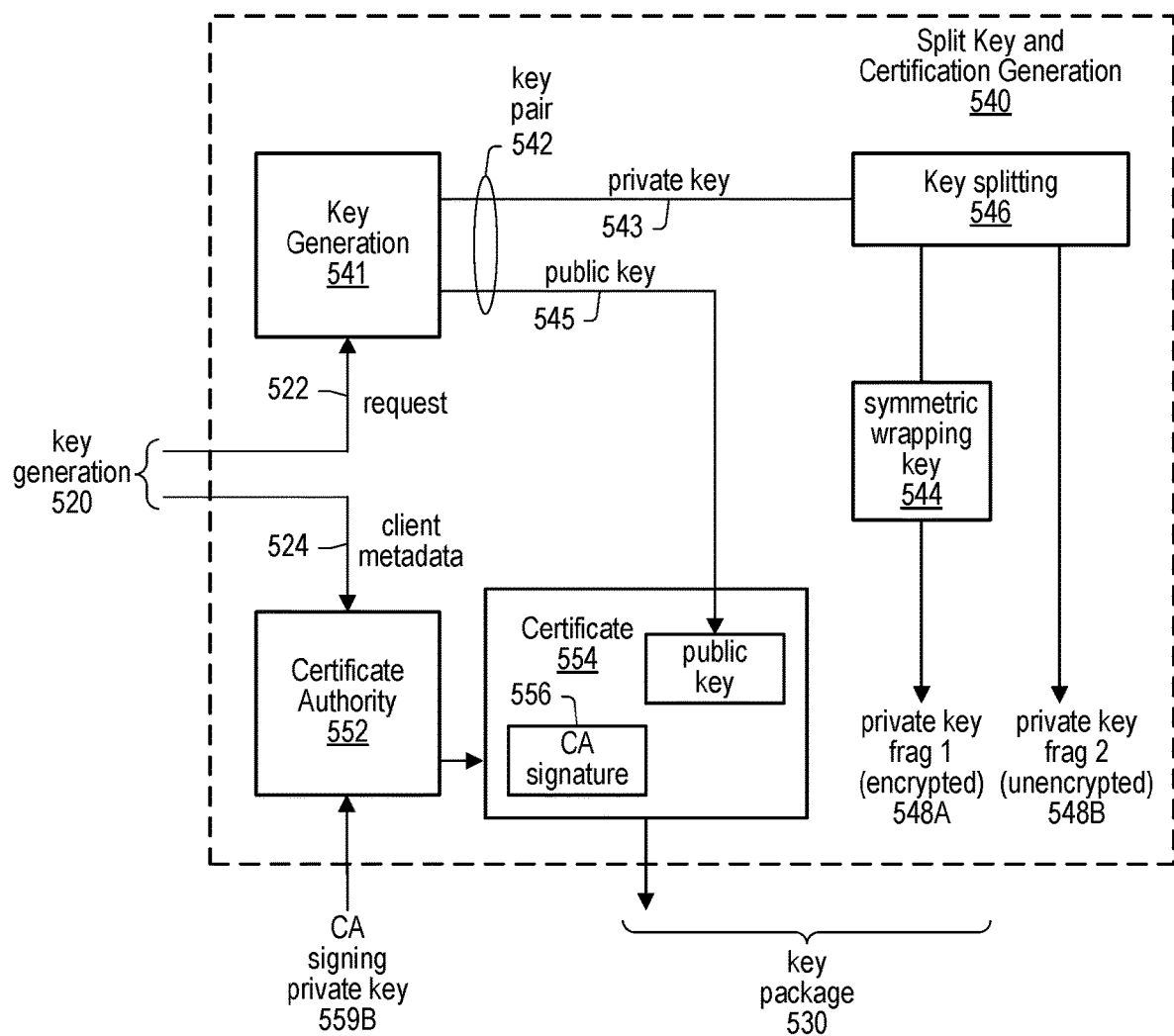
FIG. 5 is a block diagram of a module that performs key and certificate generation, according to one embodiment.

FIG. 5 is a block diagram of one implementation of the split key and certificate generation module 440 from FIG. 4, and provides more detail about how the key package is generated. Similar elements from FIG. 4 are indicated with a leading "5" instead of a leading "4." For example, split key and certificate generation module is indicated in FIG. 5 using reference numeral 540.

As shown, key generation request 520 includes request 522 and client metadata 524. In one embodiment, request 520 is in the form of a CSR. In response to 520, a key request 522 is sent to key generation module 541, which generates key pair 542 consisting of private key 543 and public key 545. Private key 543 is then split by key splitting module 546. One fragment is encrypted by symmetric wrapping key 544 to produce encrypted private key fragment 1 (548A) for inclusion in key package 530. The other private key fragment is unencrypted private key fragment 2 (548B).

Certificate authority module 552 receives client metadata 524 (which may be in the form of a CSR) and CA private signing key 559B, which may be stored at node 1. It uses this information to generate certificate 554, which includes public key 545 and includes a CA signature generated using CA private signing key 559B. Certificate 554 is also included in key package 530, which can itself be signed, such as with signing private key fragments 450A-B as described above with reference to FIG. 4.

Note that in this embodiment, the security controller does not retain any information related to key generation request 520. In other words, neither the public key nor the private key fragments are retained by the security controller. Accordingly, the security controller can be said to be stateless with respect to key generation and usage requests. As will be described below, this means that, at least in some embodiments, the security controller need not retain any information about keys generated for client applications in order to subsequently facilitate key usage. As will be described with respect to FIG. 8, when a key is desired to be used to sign a data value, the client application will pass the encrypted private key fragment back to the security controller for decryption; this amount of information is sufficient for the security controller to facilitate key usage.

Figure 6:
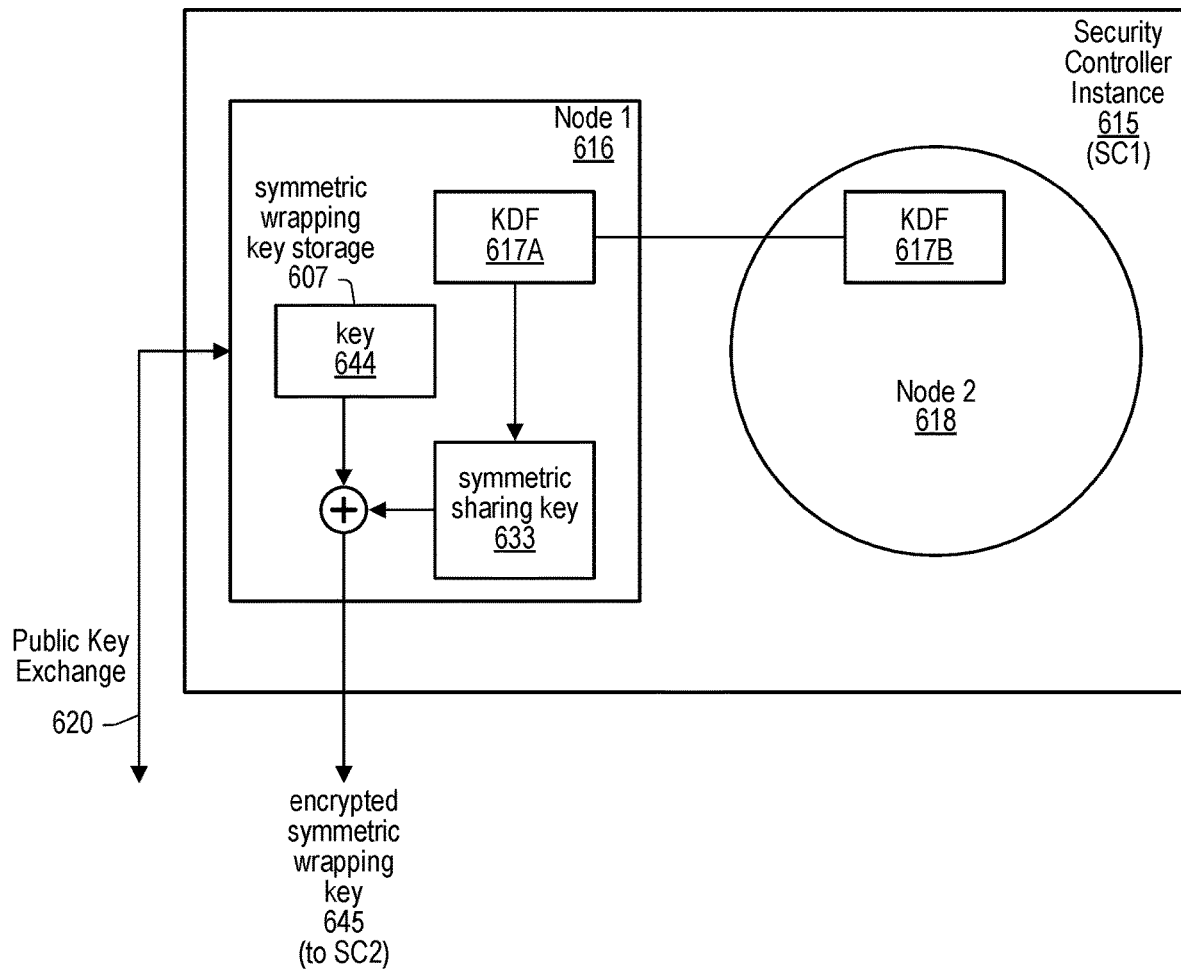
FIG. 6 is a block diagram of a multi-node security controller that generates a symmetric sharing key, according to one embodiment.

Turning now to FIG. 6, a block diagram illustrating sharing of symmetric wrapping keys between security controller instances is shown. As has been described, a symmetric wrapping key such as key 644 may be used to encrypt a fragment of a private key for a client application. Further, it may be desirable to have multiple security controller instances in order to ensure that key generation and usage requests can efficiently be serviced. By having multiple security controller instances, if one instance is busy or offline, another one can handle key generation and usage requests.

To facilitate multiple security controller instances, a means for passing symmetric wrapping keys between instances is useful. Consider an existing security controller instance (SC1, reference numeral 615) and a new security controller instance (SC2) being brought online. SC2 needs to acquire the symmetric wrapping key 644 (or keys) from SC1. To begin this process, both SC1 and SC2 each create key pairs, and a public key exchange 620 is performed. These keys may be referred to as "ephemeral" keys since they are created just for the purpose of this exchange and are not long-lived. The ephemeral private key created by security controller instance 615 (SC1) may be split between key derivation function (KDF) modules 617A-B, which reside on nodes 616 and 618, respectively. These fragments may be elliptic curve Diffie-Hellman (ECDH) fragments in one implementation. SC1 uses the public key of SC2, along with the split private keys of nodes 1 and 2 to produce symmetric sharing key 633. This may be performed using a key agreement algorithm, or, as shown, a key derivation function. SC2 performs a similar operation using SC1's public key and can use its split private key fragments to also derive key 633. SC1 then uses symmetric sharing key 633 to encrypt symmetric wrapping key 644, thereby producing encrypted symmetric wrapping key 645, which is then sent to SC2. SC2 can then decrypt key 645 using its version of key 633. Note that the key agreement or key derivation process need not be split across two nodes in some embodiments.

Symmetric wrapping key 644 may be changed periodically (it may be set to expire on some desired time basis). The procedure for doing so can be the same as provisioning a new security controller instance from scratch. By using MPC techniques to generate symmetric sharing key 633, this ensures that a malicious actor cannot cause key 644 to be passed from SC1 to a new security controller instance (and thus exploited) by obtaining control over only node 1 of SC1.

Figure 7:
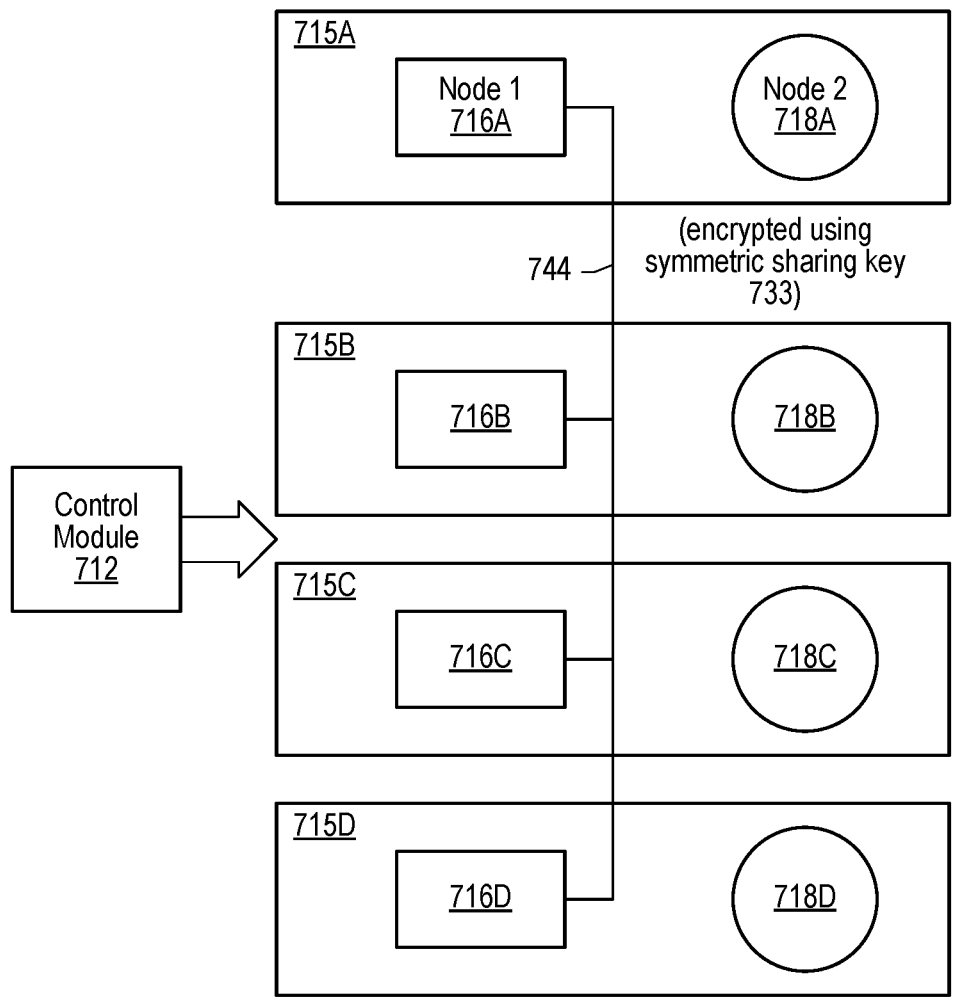
FIG. 7 is a block diagram illustrating use of a symmetric sharing key to pass a symmetric wrapping key between security controller instances, according to one embodiment.

FIG. 7 depicts a block diagram that shows the operation of security controller 710, which in this embodiment includes four security controller instances, 715A-D. As shown, each instance 715 includes two nodes (716A-D and 718A-D) that operate as described with respect to FIG. 6. Each of instances 715 can generate a key pair for a client application that includes a split private key in response to receiving a key generation request, and can do so by signing a certificate using MPC techniques. Furthermore, a given instance 715 can communicate a current symmetric wrapping key 744 with another instance—key 744 is encrypted using a symmetric sharing key 733 generated using a shared secret derived from a public key exchange between the two instances (as described with reference to FIG. 6).

As shown, security controller 710 also includes control module 712, which can operate to route incoming requests to one of the security controller instances 715. Thus, if instance 715A is busy or unavailable (e.g., the computing system hosting nodes 716A or 718A is down), control module 712 can route an incoming request to another instance (e.g., 715C). Control module may also operate to coordinate the provisioning of new instances, and may instruct a particular instance to provision another instance with the current symmetric wrapping key, to re-provision its own symmetric wrapping key, etc.

To sum up the key generation process, the key package returned to the client application in response to a key generation request may include the certificate with the public key, as well as the encrypted fragment of the private key. The security controller may also return the unencrypted fragment of the private key separate from the key package. The encrypted private key fragment included in the key package is notable in that the client application does not have access to the decrypted version of this fragment since the symmetric wrapping key is held by the security controller and is thus inaccessible to the client application. This process thus preserves the security of the split private key without requiring a second authentication factor that is checked outside the context of cryptographic operations.

Use of the Generated Split Keys

Once a private key has been generated for a client, the client will need to be able to actually use the key. For example, the client may be trying to authenticate to another entity (an "authenticating entity"), which issues a challenge to the client. The client is expected to sign a data value (also called a nonce or random value) included in the challenge with its private key and return the signed data value as a response to the challenge. The authenticating entity can then verify the signed data value using the client application's public key to determine if the data value matches the one issued as part of the challenge. Such a process occurs routinely as part of a TLS handshake, for example.

Figure 8:
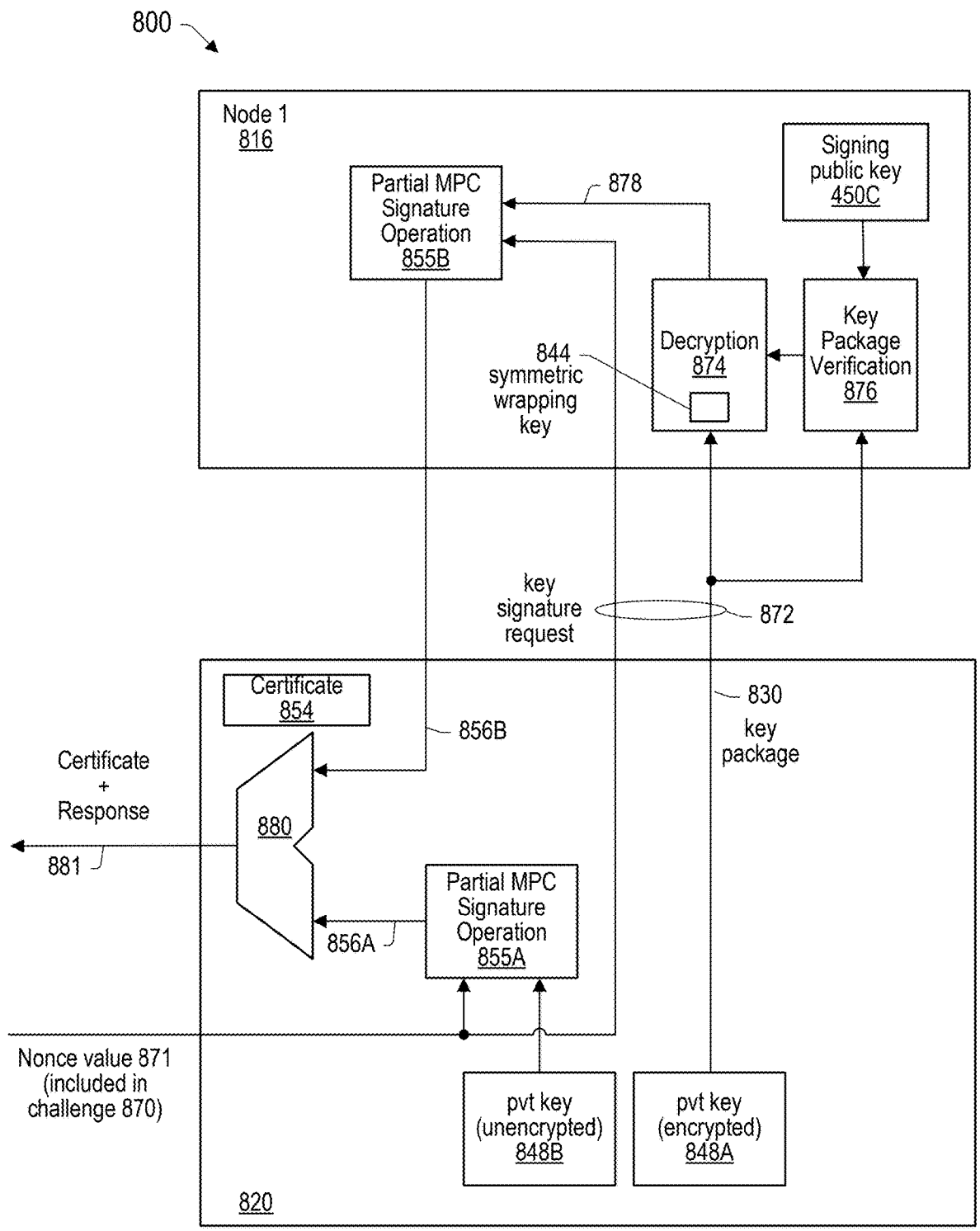
FIG. 8 is a block illustrating use of a split private key by a client application to sign a data value in conjunction with a security controller, according to one embodiment.

FIG. 8 is a block diagram of a system 800 that illustrates the joint use of a split private key by node 1 (816A) of a security controller and client application 820 to sign a data value. As shown, client application 820 receives a challenge 870 from another entity (the "authenticating entity") that includes a nonce value 871 that is to be signed by the client application's (split) private key.

As shown, client application 820 includes a module 855A that is executable to perform a partial MPC signature operation using the unencrypted private key fragment 848B to generate a partial signature 856A of nonce value 871. Client application 820 also contacts node 1 (816) of the security controller with key signature request 872. In the depicted embodiment, request 872 includes nonce value 871 and the previously returned key package 830, which, as noted, includes the encrypted private key fragment 848A. Key package verification module 876 can use its signing public key 450C (the counterpart to the split signing private key 450A-B used to originally sign the package) to make sure there has been no tampering with the key package since it was originally returned to the client application. This module can also compare identity information of the client application 820 that is making request 872 to identity information found in the key package (e.g., IP address) in order to ensure that the request is coming from the entity to which the certificate was originally issued.

Upon verification by module 876, decryption module 874 decrypts encrypted private key fragment 848A using symmetric wrapping key 844. This action produces decrypted private key fragment 878, which is used, along with nonce value 871 to perform partial MPC operation 855B, which in turn produces partial signature 856B.

In some embodiments, key package verification module 876 can simplify the processing for subsequent requests to perform a signature with the same private key. For example, module 876 might be able to recognize that it has received the same key package before, and be able to skip the verification step. Additionally, a decrypted version of private key fragment 848A (as decrypted by symmetric wrapping key 844) might be stored in a short-lived cache, such that when a recognized key package is received, the decryption step can be skipped in addition to skipping the check of the package signature.

In one implementation, partial signature 856B is passed back to client application 820 as the response to request 872. Partial signatures 856A (generated by client application 820) and 856B (generated by node 1 of the security controller) are combinable by a combination module 880 that produces the final signature of nonce value 871 as part of response 881, which can also include certificate 854.

Note that in some embodiments, the MPC functionality may be implemented as a JAVA KeyStore, such that the client application itself need not handle the intricacies of the MPC implementation.

Note that the MPC outputs may be performed in any order. For example, in some embodiments, the security controller can produce its partial MPC output first, followed by the client. In other words, the client can request the security controller's MPC output first, and then subsequently compute its own MPC output. In another embodiment, client application 820 can pass partial MPC signature 856A as part of key signature request 872, allowing node 1 (816) to combine the partial MPC signatures and return the combined MPC signature to client application 820.

Figure 9A:
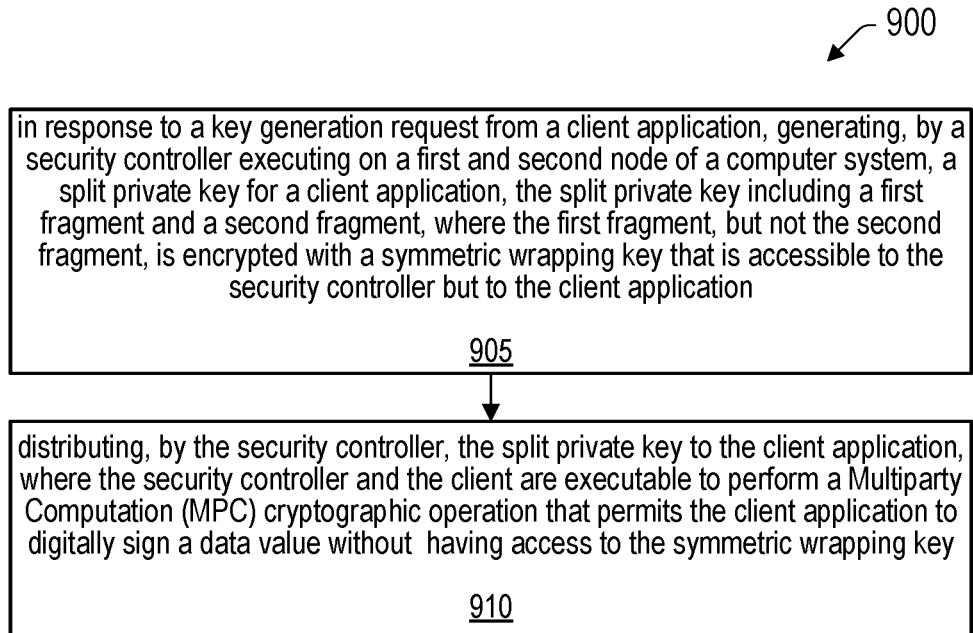
FIG. 9A is a flow diagram of one embodiment of a method performed by a multi-node security controller for generating and distributing a split private key to a client application.
Figure 9B:
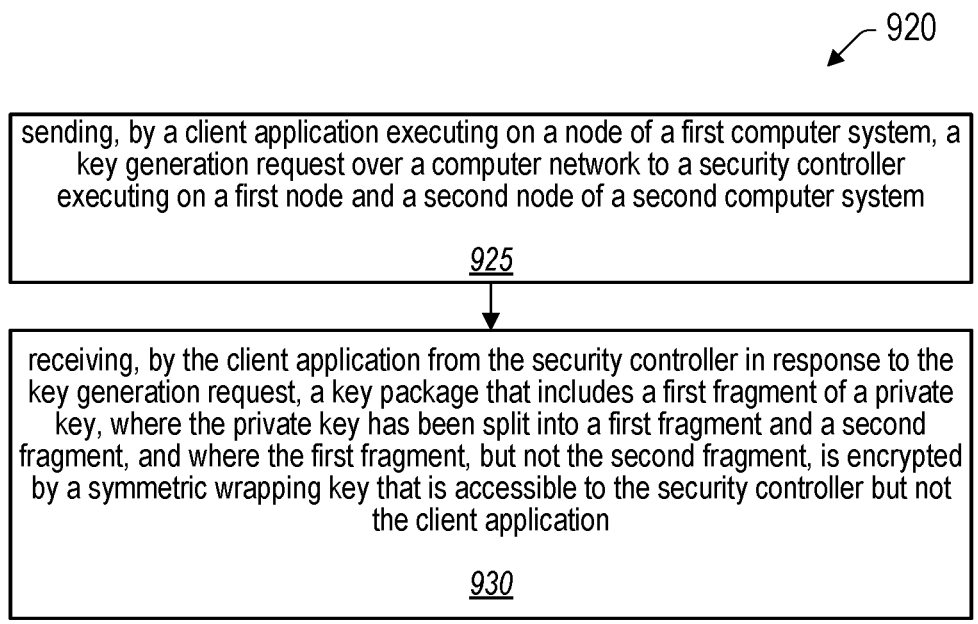
FIG. 9B is a flow diagram of one embodiment of a method performed by a client application for requesting a split private key from a multi-node security controller.

Operations associated with the embodiments of FIGS. 3-8 are now summarized with respect to FIGS. 9A-D. These Figures are similar to FIGS. 2A-D, with the primary difference being that the security controller described with respect to these Figures is implemented using multiple nodes. FIGS. 9A-B are directed to the key generation process, while FIGS. 9C-D are directed to the key usage process. FIGS. 9A and 9C are from the perspective of the security controller, while FIGS. 9B and 9D are from the perspective of the client application.

FIG. 9A is a flow diagram of one embodiment of a method 900 performed by a security controller for generating and distributing a split private key to a client application.

Method 900 begins in 905, in which a security controller executing on at least a first and second node of a computer system generates a split private key in response to a key generation request (e.g., a CSR) from a client application. The split private key for the client application includes a first fragment and a second fragment, with the property that the first fragment, but not the second fragment, is encrypted with a symmetric wrapping key accessible to the security controller but not to the client application.

In 910, the security controller distributes the split private key to the client application. The distribution of the split private key allows the client application to subsequently use the split private key. More specifically, the security controller and client application are coded with program instructions making them executable to perform a Multiparty Computation (MPC) cryptographic operation that permits the client application to use the split private key to digitally sign a data value without having access to the symmetric wrapping key.

Numerous variations of method 900 are contemplated and possible. With respect to the division of labor between the nodes, for example, the symmetric wrapping key may be accessible only by the first node (e.g., in a short-lived cache), such that the MPC cryptographic operation that permits a digital signature using the split private key is performed by the first node and the client application without the involvement of the second node.

As noted, a key package may be used to distribute the split private key to the client application. In some implementations, the key package includes the first fragment (which has been encrypted using the symmetric wrapping key). The key package may also include a certificate for the client application that is signed by the security controller. The certificate may include a public key generated by the security controller responsive to the key generation request (this public key is part of the key pair that also includes the split private key). Note that the key package may not include the second fragment in some implementations. One potential reason for this relates to the subsequent use of the key for signature purposes. When the split private key is used to sign a digital data value, the second fragment need not be passed to the security controller since the client application can generate a partial MPC signature using the second fragment. By excluding the second fragment from the key package, the key package can simply be passed back to the security controller when a signature is requested. In this manner, the security controller, after distributing the first and second fragments originally, will not have access to both fragments at the same time for the remainder of the life of the split private key.

Additionally, the key package may be digitally signed by the security controller using a signing private key (e.g., a Digital Signature Algorithm (DSA) key). This allows the digital signature of the key package to be verified using the same algorithm (e.g., by using the corresponding signing public key paired with the signing private key). In some implementations, the signing private key may be split between the first and second nodes of the security controller such that both nodes have fragments of this key. In such an implementation, the first and second nodes are executable, in response to the key generation request, to perform another MPC cryptographic operation to produce the digital signature for the key package.

In some embodiments, it may be desirable to implement multiple instances of the security controller. These instances might have identical functionality, which permits redundancy in the event that a particular instance is busy or offline.

In some embodiments, each security controller instance executes on a (different) pair of nodes of the computer system. Consider a first security controller instance that has a current copy of the symmetric wrapping key that is used encrypt private key fragments. Next consider a second security controller instance that is being newly provisioned. The first security controller instance can perform a key agreement protocol (e.g., Diffie-Hellman) with the second security controller instance to generate a symmetric sharing key. This key is referred to as a "sharing" key because its purpose—to pass the symmetric wrapping key between security controller instances—is different from that of the symmetric wrapping key (which is to encrypt a fragment of a split private key). The symmetric sharing key can thus be used to encrypt the symmetric wrapping key for transmission from the first security controller instance to the second security controller instance. By passing the symmetric wrapping key to the second security controller instance, this permits the second security controller instance to handle a subsequent key signature request from the client application in the same manner that the first security controller instance would. This key agreement protocol may be performed between any of a plurality of security controller instances.

In some cases, generation of the symmetric sharing key may include an MPC operation. Generating the symmetric sharing may thus include the first security controller instance generating a key agreement key pair, splitting a private key of the key agreement key pair between the first and second nodes, sending a public key of the key agreement key pair to the second security controller instance, and using the split private key of the key agreement key pair and a public key of the second security controller instance to perform an MPC cryptographic operation using the first and second nodes to generate the symmetric sharing key.

As noted, a symmetric sharing key may be used in various situations, such as when a new security controller instance is brought online. Additionally, symmetric wrapping keys may be periodically reset. One security controller instance may be designated as the "master" instance, and periodically generate a new symmetric wrapping key. In this instance, a new symmetric sharing key might be generated. The symmetric sharing key might also be periodically reset, independent of the symmetric wrapping key. These types of operations may be handled by control module 712 depicted in FIG. 7.

Method 900 can also involve steps relating to the use of the split private key to digitally sign a data value. For example, the client application may receive a challenge to digitally sign a data value with the split private key. In response, the client application sends, to the security controller, a key signature request that includes the first (encrypted) fragment and the data value. The client application also generates a first partial MPC signature using the second fragment.

In response to the key signature request, the security controller decrypts the fragment using the symmetric wrapping key (e.g., this may be done by the first node if that is the node that stores the wrapping key). The security controller then generates a second partial MPC signature using the decrypted first fragment. The first and second partial MPC signatures are combinable to generate a final MPC signature for the data value. Note that the partial MPC signatures may be combined by either the client application, the security controller, or some other entity.

FIG. 9B is a flow diagram of one embodiment of a method 920 performed by a client application for requesting a split private key from a security controller. In 925, a client application executing on a node of a first computer system sends, over a computer network, a key generation request (e.g., a CSR) to a security controller executing on first and second nodes of a second computer system. In 930, the client application receives, from the security controller in response to the key generation request, a key package that includes at least a first fragment of a private key for the client application. The private key is split into the first fragment and a second fragment. The first fragment is encrypted by a symmetric wrapping key that is accessible to the security controller but not to the client application. The second fragment is not encrypted by the symmetric wrapping key.

As has been described, in some implementations, the client application receives the entirety of the split private key, albeit in fragments. But the client application does not have access to the entirety of the private key in the clear, because, unlike the security controller, it does not have access to the symmetric wrapping key. In other implementations, the client application might receive only a portion of the split private key, such as a fragment not encrypted by the symmetric key. In such implementations, the security controller might retain the encrypted fragment of the split private key, for use in subsequent key usage. Methods for use of a split private key, from the perspective of both the security controller and the client application, are now described with respect to FIGS. 9C-D.

FIG. 9C is a flow diagram of one embodiment of a method 940 performed by a security controller for using a split private key to digitally sign a data value.

Method 940 begins in 945, in which a security controller executing on a first node and a second node of a computer system receives a request from a client application to use a split private key to digitally sign a data value, where the client application is executing on a different node of the computer system (the different node is considered "remote" since is executing on a different host computing device than that of the first and second nodes, and is thus coupled to the first and second nodes of the security controller via a computer network). The split private key includes a first fragment and a second fragment. The first fragment, but not the second fragment, is encrypted by a symmetric key that is inaccessible to the client application.

In 950, the security controller uses a decrypted version of the first fragment to perform a first Multiparty Computation (MPC) cryptographic operation to generate a first partial output (e.g., first partial signature). The client application from which the security controller receives the request is executable to use the second fragment to perform a second MPC cryptographic operation to generate a second partial output (e.g., second partial signature). The first and second partial outputs are combinable to create a digital signature for the data value on behalf of the client application without the client application having access to the symmetric wrapping key.

As has been noted, the first and second MPC cryptographic operations may be performed in any order. Further, the combining of the first and second partial outputs may be performed by different entities in different implementations. In one implementation, for example, the first and second partial outputs are combined by the client application and used as a digital signature of a response to a challenge to the client application from an authenticating entity.

FIG. 9D is a flow diagram of one embodiment of a method 960 performed by a client application for using a split private key to digitally sign a data value. Method 960 is similar to method 940, as the client application and the security controller both act to generate a digital signature for a data value on behalf of the client application. In 965, a client application executing sends a request to the security controller to use a split private key to digitally sign a data value, the split private key having a first fragment and a second fragment. The first fragment, but not the second fragment, is encrypted by a symmetric key that is inaccessible to the client application. The security controller is executable to use a decrypted version of the first fragment to perform a first Multiparty Computation (MPC) cryptographic operation to generate a first partial output (e.g., first partial signature). In method 960, the security controller is executing on first and second nodes of a computer system, and the client application is executing remotely on a different node of the computer system.

In 970, the client application uses the second fragment to perform a second MPC cryptographic operation to generate a second partial output (e.g., second partial signature). The first and second partial outputs are combinable to create a digital signature for the data value without the client application having access to the symmetric key. Some variations of method 960 include the client application combining the first and second partial outputs to generate the digital signature.

All of the above methods can be implemented by program instructions stored on a computer-readable storage medium that are capable of being executed by a computer system. (Note that in some cases, program instructions may be stored on a storage medium but not enabled to execute in a particular computing environment—the recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, a computer system that implements the methods described with respect to FIGS. 9A-D is also contemplated.

Figure 10:
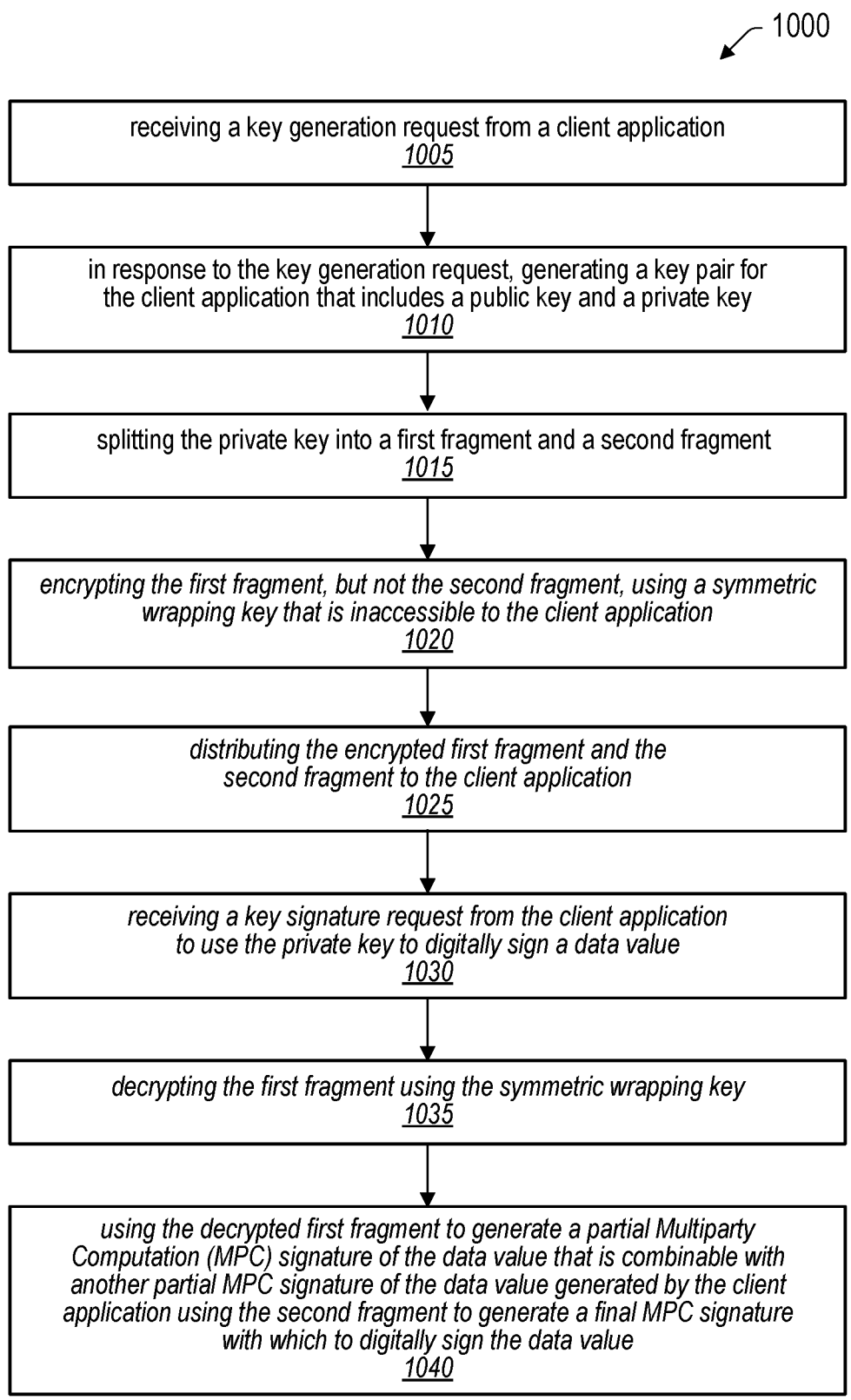
FIG. 10 is a flow diagram of one embodiment of a method performed by a multi-node security controller for generating and distributing a split private key to a client application and using a split private key to digitally sign a data value in conjunction with a client application.

The methods of FIGS. 9A-D were primarily discussed from the perspective of a single actor (e.g., security controller or client application) acting on a single type of request (e.g., key generation request or key signature request). FIG. 10 presents the actions of a security controller with respect to both a key generation request and a key signature request in a single method.

As shown, method 1000 begins with 1005, in which a security controller application receives a key generation request from a client application. In response to the key generation request, the security controller performs 1010, 1015, 1020, and 1025. In 1010, the security controller generates a key pair for the client application that includes a public key and a private key. In 1015, the security controller splits the private key into a first fragment and a second fragment, followed by 1020 in which the security controller encrypts the first fragment using a symmetric wrapping key that is not accessible to the client application. (The second fragment is not encrypted in this manner in method 1000.) In 1025, the security controller distributes the encrypted first fragment and the second fragment to the client application as a response to the key generation request.

In 1030, the security controller receives a key signature request from the client application to use the private key to digitally sign a data value, where the key signature request includes the encrypted first fragment and the data value. In response, the security controller performs 1035 and 1040. In 1035, the security controller decrypts the first fragment. Then, in 1040, the security controller uses the decrypted first fragment to generate a partial Multiparty Computation (MPC) signature of the data value that is combinable with another partial MPC signature of the data value generated by the client application using the second fragment to digitally sign the data value.

As with the method described in FIG. 9A, numerous variations of method 1000 are contemplated and possible. For example, the security controller may be implemented on a first and second node of a computer system.

Moreover, the security controller may, in response to the key generation request, additionally generate a key package that includes the first fragment and digitally sign the key package by performing an MPC cryptographic operations using a signing private key that is split into fragments stored at the first and second nodes. The signing private key may be a digital signature algorithm (DSA) key in one implementation (or an ECDSA key, etc.). The key package may further include a certificate for the client application that is signed by the security controller, where the certificate includes a public key generated by the security controller responsive to the key generation request.

In some embodiments, the security controller is a first of a plurality of security controller instances, and the first security controller instances perform a key agreement protocol with a second of the security controller instances to generate a symmetric sharing key for encrypting the symmetric wrapping key for transmission from the first security controller instance to the second security controller instance to permit the second security controller instance to handle a subsequent key signature request from the client application. Where the security controller is executed on a first node and a second node, the first security controller instance generating the symmetric sharing key may include generating a key agreement key pair, splitting a private key of the key agreement key pair between the first and second nodes, sending a public key of the key agreement key pair to the second security controller instance, and using the split private key of the key agreement key pair and a public key of the second security controller instance to perform an MPC cryptographic operation with the first and second nodes to generate the symmetric sharing key.

Method 1000 can be implemented by program instructions stored on a computer-readable storage medium that are capable of being executed by a computer system. Similarly, a computer system that implements the methods described with respect to FIG. 10 is also contemplated.

Security Controller with Remote and Local Components

In the previously discussed embodiments, the client application executes on a first host computing device and the security controller (which may be split across two nodes) executes on a second host computing device connected over the network. The inventors have recognized that there may be costs associated with making requests associated with keys over the network. For example, if there is a network problem, a transaction involving the key cannot be completed, leading to service outages and business interruptions. Furthermore, requests over a network add latency.

To address these problems while still enjoying the benefits of MPC cryptography, the inventors propose running a local process on a client system. This process is referred to as the local security controller, or LSC. The LSC works with a remote security controller, or RSC, which runs on a different host computing device that is accessible by the LSC over a network. Multiple applications on a given host computing device may each be able to request their own split private keys from the RSC. Subsequently, the client applications can each interact with the LSC to sign data values with their respective private keys—without having to make a request to the RSC over the network.

Figure 11:
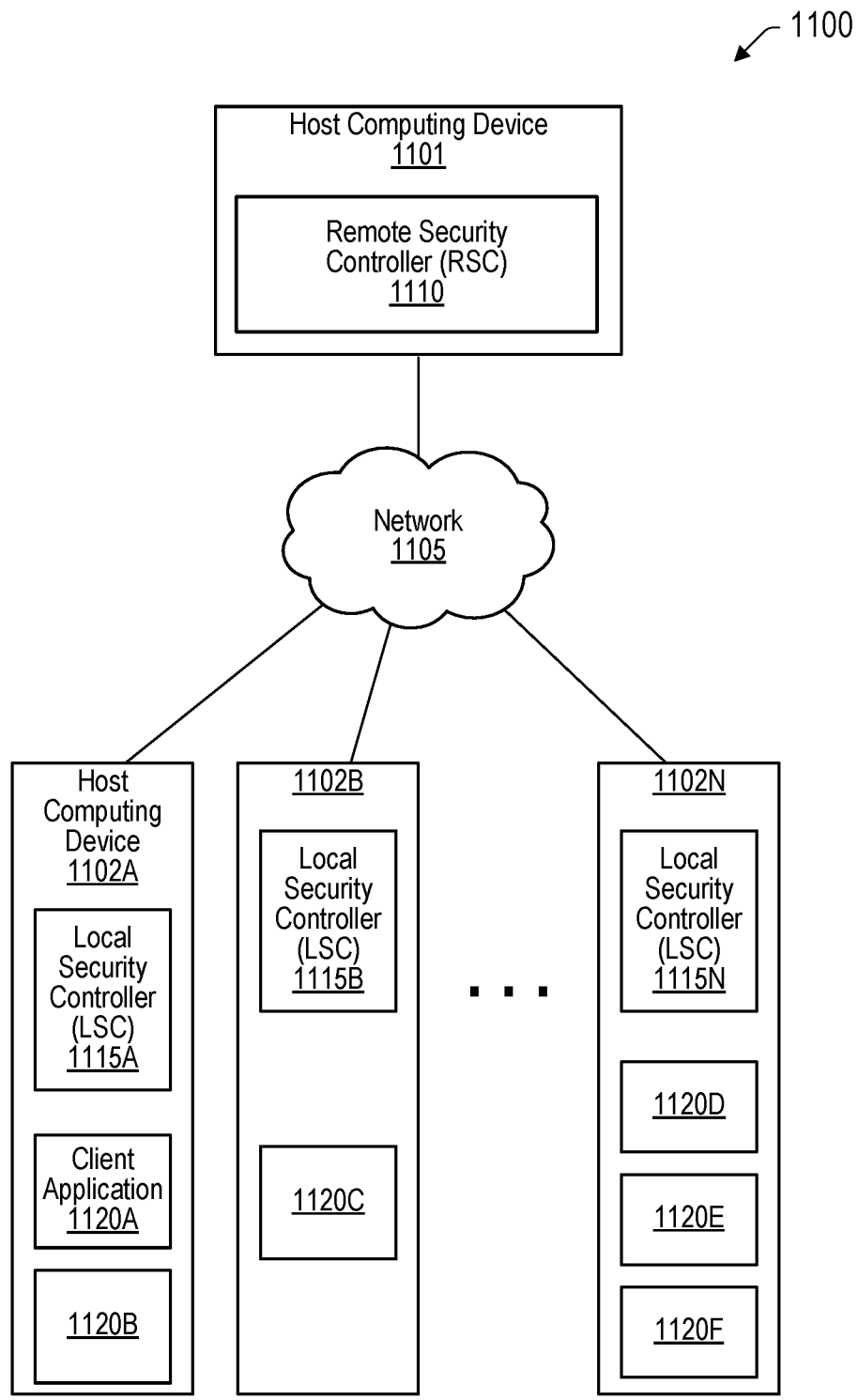
FIG. 11 is a block diagram illustrating one embodiment of a remote security controller coupled to a plurality of host computing devices over a network that include a local security controller and one or more client applications.

FIG. 11 illustrates a block diagram of one embodiment of such a paradigm. As depicted, computer system 1100 includes host computing devices 1101 and 1102A-N that are coupled via computer network 1105. Host computing devices 1101 and 1102 have hardware configurations such as those described above with reference to FIG. 3.

Host computing device 1101, as shown, stores program instructions executable to implement RSC 1110. Similarly, the various host computing devices 1102A-N store program instructions executable to implement LSCs 1115 and client applications 1120. As will be described, RSC 1110 and a given LSC 1115 combine to perform functionality similar to the security controllers previously described in this disclosure. Note that the labels "remote" and "local" are from the perspective of the client application. Consider client application 1120A. LSC 1115A is "local" and RSC 1110 is "remote," as LSC 1115 and client application 1120A both reside on host computing device 1102A, while RSC 1110 is located on host computing device 1101.

RSC 1110, in various embodiments, is executable to perform a key agreement protocol with the various LSCs 1115 to establish a symmetric key. Note that host computing device 1101 may also host a key management service (KMS) in some embodiments. The number of symmetric keys generated within system 1100 may also vary. In some embodiments, there is one symmetric key for all client applications 1120 on a given host computing device. In other embodiments, there is one symmetric key for each client application 1120 on each LSC 1115. Numerous other alternatives are also possible.

Once RSC 1110 has established a symmetric key for a given LSC 1115 or client application 1120, it can receive key generation requests for a client application 1120. In various embodiments, a given key generation request may be received at RSC 1110 from the client application 1120 in question, or from the corresponding LSC 1115 (or some other entity on behalf of client application 1120). RSC 1110 then creates a key pair that includes a split private key with fragments as has been described above (one fragment encrypted by the symmetric key, the other not encrypted with this key). These fragments are then returned to the requesting host computing device 1102.

When a particular client application 1120 then needs to use its split private key to digitally sign a data value, it no longer needs to make an access that travels over computer network 1105. Instead, client application 1120 performs a partial MPC signature with the unencrypted key fragment, and then contacts LSC 1115 with a request to perform a partial MPC signature with the encrypted key fragment. As will be described, the relevant LSC 1115 is able to derive the symmetric key by performing its version of the key agreement protocol previously performed by RSC 1101, and is thus able to decrypt the encrypted private key fragment and use it to perform the other partial MPC signature. The two partial MPC signatures are combinable to form a final signature of the data value.

As noted, the key signature request between client application 1120 and LSC 1115 need not travel over network 1105. Because the likelihood of a single-host-computing-device signature transaction failing is less than a network failure, this approach represents an improvement in reliability.

Communication between client application 1120 and LSC 1115 may be performed by inter-process communication (IPC) in some embodiments, which provides a high degree of security. Additionally, since the process is local, it provides better service level availability (SLA). Finally, if every client application 1120 had the capability to contact an LSC, it would be easier for work to be handled in a distributed fashion. In some embodiments, LSC 1115 and a given client application 1120 run on host computing device 1102 with different user identities so as to provide OS-level user/process isolation for better security.

Key Generation

Figure 12:
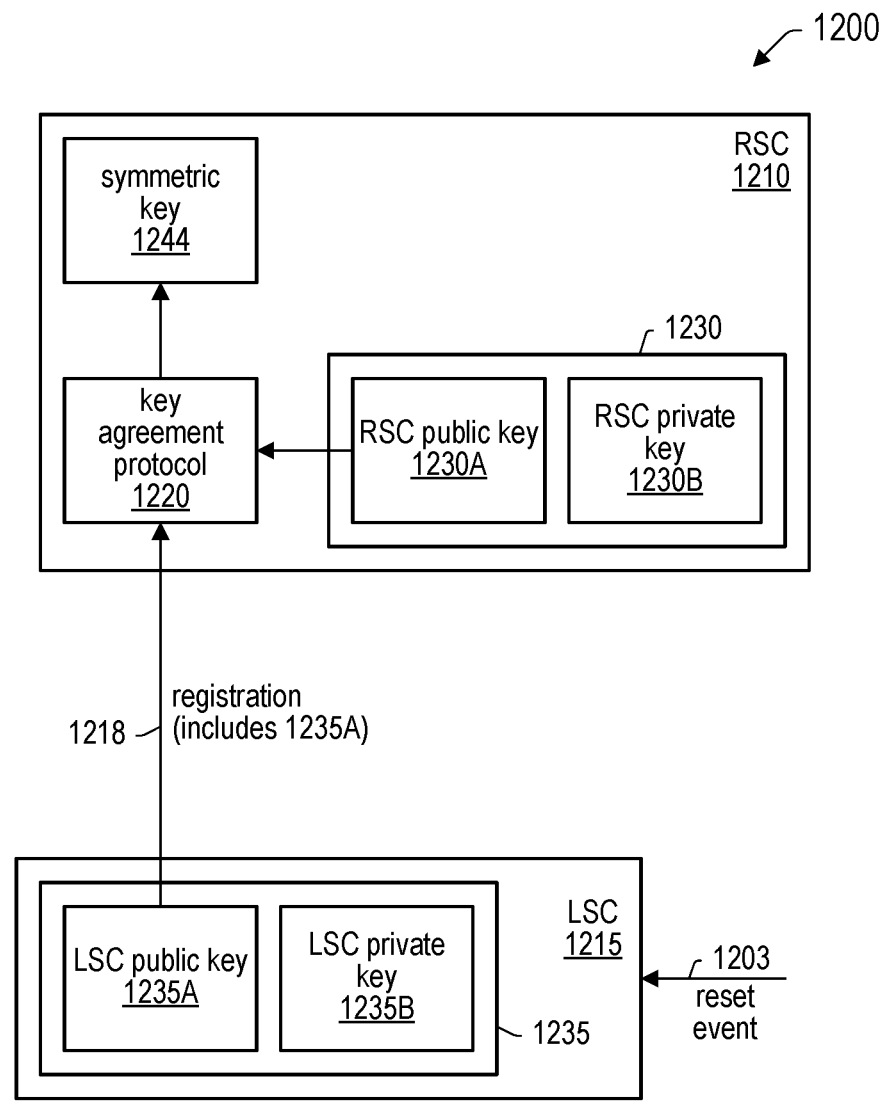
FIG. 12 is a block diagram illustrating one embodiment of a registration process between a local security controller and a remote security controller.

FIG. 12 is a block diagram of one embodiment of a computer system 1200 in which a registration process occurs between RSC 1210 and LSC 1215. Elements in FIG. 12 that are similar to those in earlier Figures are numbered similarly (e.g., RSC 1110 in FIG. 12 and RSC 1210 in FIG. 12). RSC 1210 stores cryptographic RSC key pair 1230, which includes RSC public key 1230A and RSC private key 1230B. Similarly, LSC 1215 stores cryptographic LSC key pair 1235, which includes LSC public key 1235A and LSC private key 1235B.

In response to a reset event 1203, LSC public key 1235A is sent to RSC 1210. This public key may be registered (stored) by the RSC for future reference in some embodiments. In the depicted embodiment, module 1220 then performs a key agreement protocol using received LSC public key 1235A and RSC private key 1230B to generate symmetric key 1244. (In another embodiment, symmetric key generation may be done when a key generation request is received from LSC 1215.) In one embodiment, RSC public key 1230A is not sent to LSC 1215 at this time. Thus, unlike scenarios in which both parties exchange public keys at more or less the same time, here the exchange of public keys is initially one-way.

Reset event 1203 may occur upon LSC 1215 being instantiated or being reset, for example. Event 1203 may also occur in response to a key generation request. Key pairs 1230 and 1235 may have different longevities as will be described below.

For example, in one embodiment, key pairs 1230 and 1235 are both ephemeral. For example, one or both of these key pairs may be generated in response to reset event 1203. For example, after LSC 1215 boots, it may generate LSC key pair 1235 such that the keys are ephemeral. RSC 1210 may do the same with respect to RSC key pair 1230. LSC 1215 can register its ephemeral public key by sending it to RSC 1210 as part of registration 1218, which may include additional information such as the IP address of the host computing device of LSC 1215. If RSC 1210 has not yet seen this public key, it creates a mapping of the IP address to LSC public key 1235A. Otherwise, RSC 1210 updates the existing mapping. LSC 1215 retains ephemeral key pair 1235 for later use, when it will need to derive symmetric key 1244.

In some embodiments, the registration process of FIG. 12 occurs when LSC 1215 boots. In other embodiments, the registration occurs as part of a key generation request by a client application co-located on a common host computing device with LSC 1215. (The key generation process is described next with respect to FIG. 13.)

In some embodiments, every time a given host computing device (i.e., a machine on which an LSC and one or more client applications are running) starts or restarts, a new LSC ephemeral cryptographic key pair is generated. Thus, the registration process of FIG. 12 and the key generation process of FIG. 13 may be performed anew upon each restart. But if the host computing device has Trusted Platform Module (TPM) technology, which supports longer-term cryptographic key storage, it may not be necessary to regenerate keys periodically or on restart.

Note that RSC 1210 may operate in conjunction with multiple different LSCs 1215, and thus may store a number of different LSC public keys, perhaps in conjunction with associated IP addresses. In some embodiments, the ephemeral public key for a given LSC is retained until the first key generation request is received from a client application on the same host as the given LSC.

Figure 13:
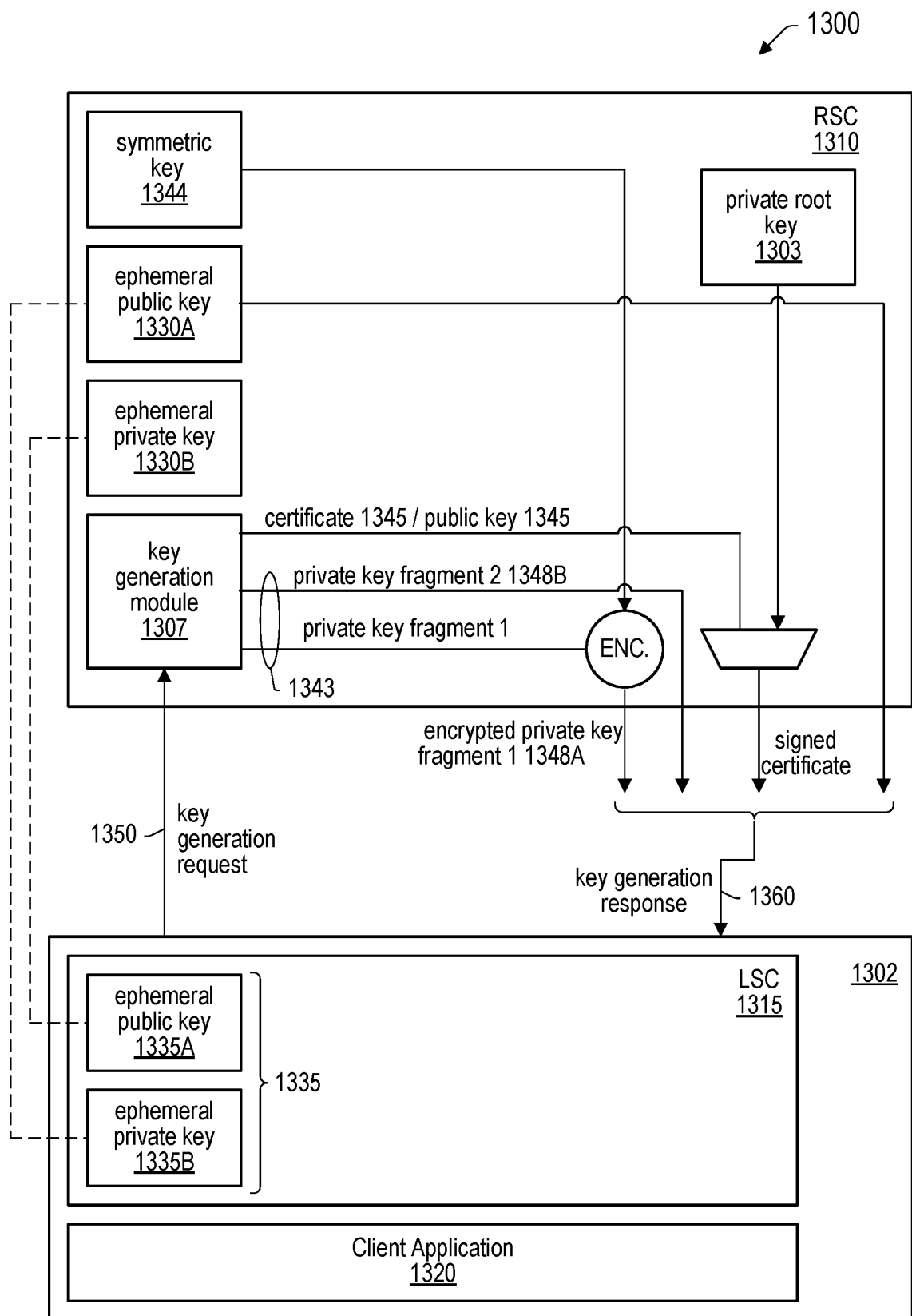
FIG. 13 is a block diagram illustrating one embodiment of a key generation process between a local security controller and a remote security controller.

FIG. 13 illustrates one embodiment of a process for responding to a key generation request from a client application once the corresponding LSC for that client application has been set up. As depicted, computer system 1300 includes RSC 1310 and host computing device 1302, which includes LSC 1315 and client application 1320. Prior to the beginning of this process, as described with reference to FIG. 12, LSC 1315 has generated LSC key pair 1335, including LSC public key 1335A that has been sent to RSC 1310. RSC 1310, on the other hand, has generated RSC key pair 1330 as part of the registration process. This key pair is specific to LSC 1315, in contrast to other key pairs held by RSC 1310, including, for example, RSC private root key 1303. In the depicted embodiment, RSC key pair 1330 and LSC key pair 1335 are ephemeral. (These keys may have different longevities in other embodiments.) LSC 1315 has either previously sent its ephemeral public key 1335A to RSC 1310 or it does so as part of the key generation process.

Key generation request 1350 in FIG. 13 is shown as generically coming from host computing device 1302, on which LSC 1315 and client application 1320 are executing. This serves to illustrate that in various embodiments, key generation request 1350 may originate either from client application 1320 or LSC 1315. In either instance, though, key generation request is for client application 1320. But request 1350 may, in different embodiments, be sent to RSC 1310 either by client application 1320 directly, or by LSC 1315 on behalf of client application 1320.

Upon receipt of key generation request 1350, key generation module 1307 in RSC 1310 generates private key 1343 and public key 1345. In keeping with the prior embodiments described in this disclosure, private key 1343 is broken into fragments. Fragment 1 is encrypted using symmetric key 1344 to produce encrypted private key fragment (1348A). Fragment 2 is referred to as unencrypted private key fragment 1348B.

To recap, in some embodiments, symmetric key 1344 has previously been generated using a key agreement protocol between RSC 1310 and LSC 1315 that utilizes RSC ephemeral private key 1330B and LSC ephemeral public key 1335A. In other embodiments, symmetric key 1344 is not generated until key generation request 1350 is received. In these implementations, the IP address of LSC ephemeral public key 1335A has been stored during registration (FIG. 12), and when key generation request 1350 subsequently arrives from the same IP address, symmetric key 1344 is generated at that point. In short, symmetric key 1344 is generated no later than key generation request 1350.

Key generation module 1307 also creates certificate 1354, which includes newly created public key 1345. Metadata that identifies client application 1320 (which may be passed in request 1350) may be hashed, appended to certificate 1354, and signed using RSC private root key 1303. Private root key 1303 may be backed by a hardware security module (HSM) or some other secure mechanism that allows it to issue certificates. In such an embodiment, RSC 1310 acts as an intermediary certificate authority (CA), and protects its private root key using similar mechanisms that a CA uses to protect its keys. This signature allows entities to whom the client application's certificate is subsequently presented to verify its authenticity using the RSC's certificate, which can include public root key (not shown) that is paired with private root key 1303.

At this point, there are a number of pieces of information that are ready to be conveyed to host computing device 1302 as part of key generation response 1360, which, as its name suggests, is responsive to key generation request 1350. This information includes encrypted private key fragment 1348A, unencrypted private key fragment 1348B, and certificate 1354 (which includes public key 1345). Also passed as part of key generation response 1360 is RSC ephemeral public key 1330A. Key 1330A, as will be seen, is usable by LSC 1315 to derive symmetric key 1344.

Key generation response 1360 may include a key package 1330. Key package 1330 may include, for example, certificate 1354, encrypted private key fragment 1348A, and, in some cases, RSC ephemeral public key 1330A. In such implementations, key generation response 1360 may include both key package 1330 (with the above-noted items), as well as unencrypted private key fragment 1348B. As will be described, this division allows client application 1320 to subsequently pass a key package to LSC 1315 for signature purposes that does not include unencrypted private key fragment 1348B, which is not needed by LSC 1315 to complete its portion of the MPC key signature process.

The constituent parts of key generation response 1360 may be received in different ways, which may be based on the origin of key generation request 1350 (e.g., either LSC 1315 or client application 1320). In some implementations, key generation request 1350 is received from client application 1320, and key generation response 1360 thus may be similarly returned to client application 1320. As will be described, in the key signature process, a client application 1320 in this implementation might pass certificate 1354, encrypted private key fragment 1348A, and RSC ephemeral public key 1330A to LSC 1315. Certificate 1354 could be used to authenticate client application 1320. Encrypted private key fragment 1348A is used to perform a portion of the signature process, and RSC ephemeral public key 1330A is used to perform the key agreement protocol between the RSC and LSC in order to derive symmetric key 1344. Key 1344 can then decrypt fragment 1348A and use the decrypted fragment to generate the partial signature. Unencrypted private key fragment 1348A is retained by client application 1320 in order to perform its portion of the signature process. In such an implementation, LSC 1315 might either retain symmetric key 1344 for subsequent signature requests, or discard key 1344 and derive it again the next time it is needed. Client application 1320 might thus need to pass its certificate and encrypted private key fragment, along with RSC ephemeral public key 1330A, for subsequent key signature requests.

In other implementations, key generation request 1350 is received from LSC 1315, and key generation response 1360 is thus returned to LSC 1315. For example, certificate 1354, encrypted private key fragment 1348A, unencrypted private key fragment 1348B, and RSC ephemeral public key 1330A may all be returned to LSC 1315. LSC 1315 might retain encrypted private key fragment 1348A and RSC ephemeral public key 1330A (since these will ultimately be used by LSC 1315 to perform its part of the signature process). LSC would then return certificate 1354 and unencrypted private key fragment 1348B to client application 1320.

In short, key generation response 1360 includes various pieces of information that can be returned to LSC 1315, client application 1320, or both.

Once a split private key has been generated for client application 1320, RSC 1310 can discard certain information. What can be discarded depends on how broadly applicable symmetric key 1344 is. In some embodiments, symmetric key 1344 applies to all client applications on a given host computing device 1302. (In other words, the first client application that makes a key generation request on a given host computing device will cause creation of symmetric key 1344, which is applicable to all client applications on that host.) In these embodiments, RSC 1310 retains symmetric key 1344 to handle future key generation requests from other client applications on that host computing device (specifically, in order to encrypt one of the fragments of the private key). But RSC 1310 can discard RSC ephemeral key pair 1330, as well as LSC ephemeral public key 1335A previously received as part of the LSC registration process. This information can be discarded because it is no longer needed since symmetric key 1344 already exists.

In other embodiments, however, symmetric key 1344 may apply only to a particular client application on a given host computing device. In these embodiments, once key generation occurs, RSC 1310 can safely discard symmetric key 1344 in addition to RSC ephemeral key pair 1330 and LSC ephemeral public key 1335A. This means that the only potential entity that can derive symmetric key 1344 is LSC 1315, further enhancing security.

Information may also be discarded at different times. For example, during the registration process, LSC 1315 sends LSC ephemeral public key 1335A to RSC 1310 along with the LSC's IP address. Once symmetric key 1344 is generated, however, it may discard LSC ephemeral public key 1335A and associate symmetric key 1344 with the IP address. This approach may be used if RSC 1310 needs to retain symmetric key 1344 for multiple client applications 1320 on a given host computing device 1302.

After key generation response 1360 is sent and any information no longer needed is discarded, RSC 1310 is ready to service subsequent key generation requests from other client applications. In embodiments in which symmetric key 1344 is used for other client applications 1320 on a given host computing device 1302, RSC 1310 will reuse symmetric key 1344 in encrypting private key fragments. In embodiments in which there is a unique symmetric key for each client application on a given host computing device, there is no need for RSC 1310 to retain symmetric key 1344 once a private key fragment has been encrypted for a given client application 1320.

After the operations described with respect to FIG. 13 have been performed, a client application is now able to use the split private key that has been generated in order to perform MPC signatures. One scenario in which a client application may need to generate a signature is when it needs to authenticate to a different entity (e.g., during an mTLS handshake). The client application may present its certificate to a different computer system ("the authenticating computer system"); in response, the authenticating computer system may generate a challenge for the application. In order to respond to this challenge, the client application needs to be able to compute a response that involves signing a hashed value with its private key. This signature allows the authenticating computer system to verify, using the client application's public key, that the client application has possession of its private key.

Use of the Generated Split Keys

Figure 14:
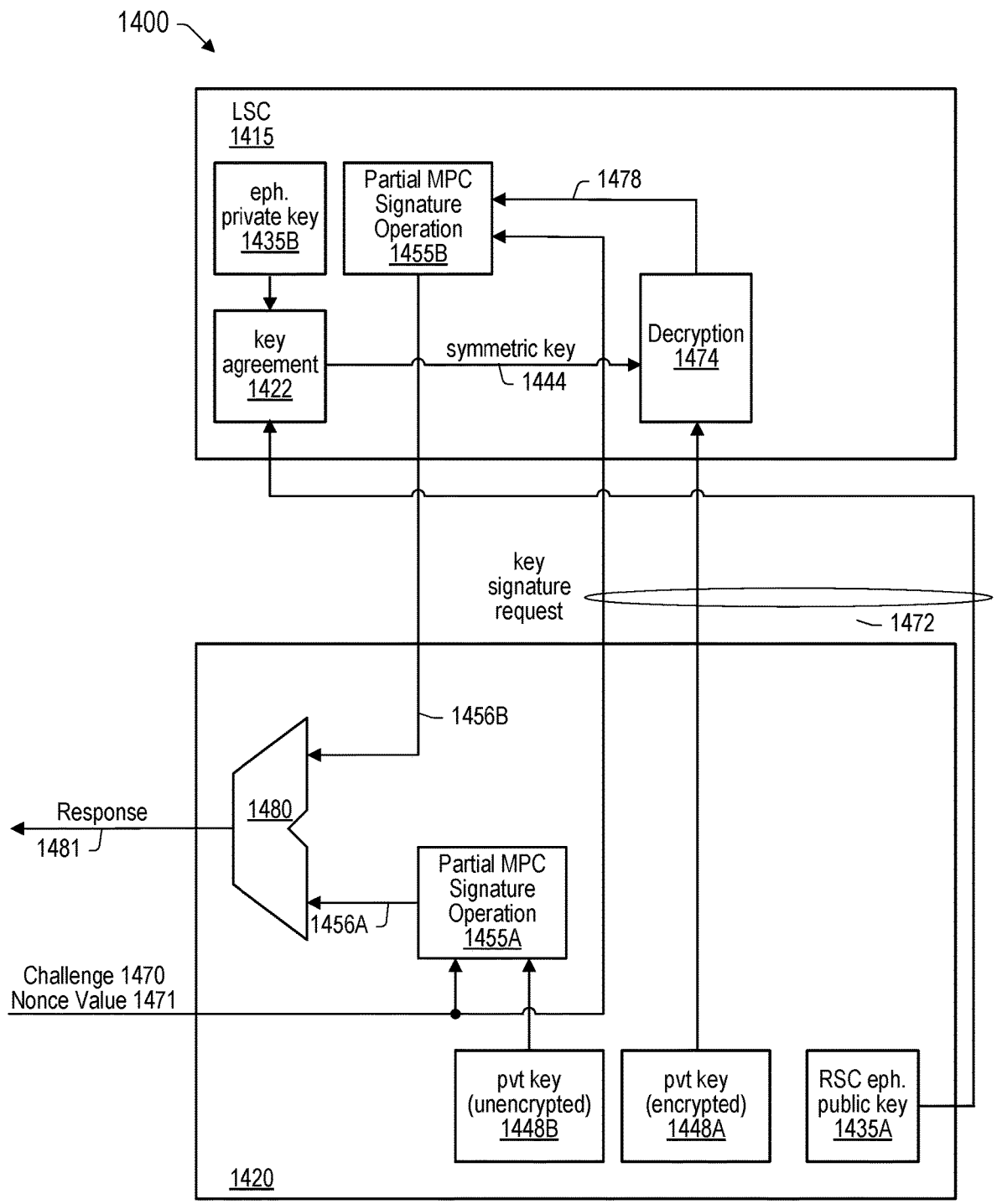
FIG. 14 is a block diagram illustrating one embodiment of a process for using a split private key to sign a digital data value.

FIG. 14 is a block diagram of one embodiment of a system 1400 that illustrates the joint use of a split private key by LSC 1415 and client application 1420 to sign a data value. FIG. 14 is similar to FIG. 8 discussed above in the context of the remote, multi-node approach. As shown, client application 1420 receives a challenge 1470 from another entity (the "authenticating entity") that includes a nonce value 1471 that is to be signed by the client application's (split) private key.

As shown, client application 1420 includes a module 1455A that is executable to perform a partial MPC signature operation using the unencrypted private key fragment 1448B to generate a partial signature 1456A of nonce value 1471. Client application 1420 also contacts LSC 1415 with key signature request 1472. In the depicted embodiment, request 1472 includes nonce value 1471, encrypted private key fragment 1448A, and RSC ephemeral public key 1330A. Decryption module 1474 decrypts encrypted private key fragment 1448A using symmetric key 1444. Key 1444 is derived by key agreement module 1422 based on ephemeral private key 1435B of the LSC, as well as ephemeral public key 1430A of the RSC. (Key 1435B was originally generated based on a reset event such as the LSC booting up. Ephemeral public key 1430A was also generated upon the LSC reset event, albeit at the RSC.) Decryption module 1474 produces decrypted private key fragment 1478, which is used, along with nonce value 1471, to perform partial MPC operation 1455B, which in turn produces partial signature 1456B. (For clarity, the RSC's performance of the key agreement protocol is referred to as key "generation," while the LSC's performance of the same protocol is referred to as key "derivation." The protocol is the same, and the terms could be interchanged.)

In one implementation, partial signature 1456B is passed back to client application 1420 as the response to request 1472. Partial signatures 1456A (generated by client application 1420) and 1456B (generated by LSC 1415) are combinable by a combination module 1480 that produces the final signature of nonce value 1471 as response 1481. As with the previously described embodiment, neither client application 1420 nor LSC 1415 has a complete unencrypted copy of the split private key during this process.

In the example shown in FIG. 14, LSC 1415 has one symmetric key for all client applications executing on the same host computing device. In other embodiments, a different symmetric key may be generated for each client application. In such embodiments, LSC 1415 would generate an ephemeral key pair for each client application and send the ephemeral public key to the RSC upon each key generation request from a client application. The process of FIG. 14 would thus be modified in accordance with this different implementation.

FIGS. 12-14 were described as using ephemeral keys for both the RSC and LSC in order to perform the key agreement protocol and generate the symmetric key used to encrypt and decrypt the encrypted private key fragment. Furthermore, embodiments in which a given LSC has a single symmetric key for all applications on the same host computing device, and in which a given LSC has a unique symmetric key for each application on the same host computing device have been discussed. Various combinations of key longevity and uniqueness on a particular LSC RSC are shown in Table 1. This table describes the keys as being based on elliptic-curve (EC) cryptography, but other types of keys are contemplated and possible. In some implementations indicated below, keys may be stored in a Trusted Platform Module (TPM).

The first four rows of the table specify a "long-lived" EC key in the TPM—that is, a key that persists across restarts. Rows 1 and 2 specify ephemeral keys at the RSC, while rows 3 and 4 specify long-lived keys at the RSC. This combination of long-lived keys at both the LSC and RSC results in symmetric keys that persist across restarts. Note that if either (or both) of the LSC and RSC has a unique EC key per application, this results in a unique symmetric key per host (LSC) per application. Rows 2 and 4 specify scenarios in which the RSC has a unique EC key per application on the LSC, while Row 7 specifies a scenario in which the LSC has a long-lived EC key in the TPM per application. Implementations indicated with an asterisk below (rows 8 and 12) may be used when a highest level of security is desired.

| LSC | RSC | Result |
|---|---|---|
| 1. Long-lived EC Key in the TPM | Ephemeral EC key per LSC host | Unique symmetric key per host for all applications |
| 2. Long-lived EC Key in the TPM | Ephemeral EC key per application per host | Unique symmetric key per application per host |
| 3. Long-lived EC Key in the TPM | Long-lived EC key in RSC | Unique symmetric key per host for all applications across restarts |
| 4. Long-lived EC Key in the TPM | Long-lived EC key in RSC per application | Unique symmetric key per application per host across restarts |
| 5. Long-lived EC key in the TPM per application | Ephemeral EC key per application per host | Unique symmetric key per application for each key provisioning request by client |
| 6. Long-lived EC key in the TPM per application | Long-lived EC key in RSC | Unique symmetric key per application per host across restarts |
| 7. Long-lived EC key in the TPM per application | Long-lived EC key in RSC per application | Unique symmetric key per application per host across restarts |
| 8. Ephemeral EC key generated on bootup* | Ephemeral EC key per application client request | Unique symmetric key per application for the life of LSC |
| 9. Ephemeral EC key generated on bootup | Ephemeral EC key per host for the life of LSC | Unique symmetric key per host for all applications |
| 10. Ephemeral EC key generated on bootup | Long lived EC key in RSC | Unique symmetric key per host for all applications |
| 11. Ephemeral EC key generated on bootup | Long lived EC key in RSC per application | Unique symmetric key per application per host |
| 12. Ephemeral EC key per application on bootup* | Ephemeral EC key per application client request | Unique symmetric key per application per host for the life of LSC |
| 13. Ephemeral EC key per application on bootup | Ephemeral EC key per host for the life of LSC | Unique symmetric key per application per host for the life of LSC |
| 14. Ephemeral EC key per application on bootup | Long lived EC key in RSC | Unique symmetric key per application per host for the life of LSC |
| Ephemeral EC key per application on bootup | Long lived EC key in RSC per application | Unique symmetric key per application per host for the life of LSC |

Figure 15A:
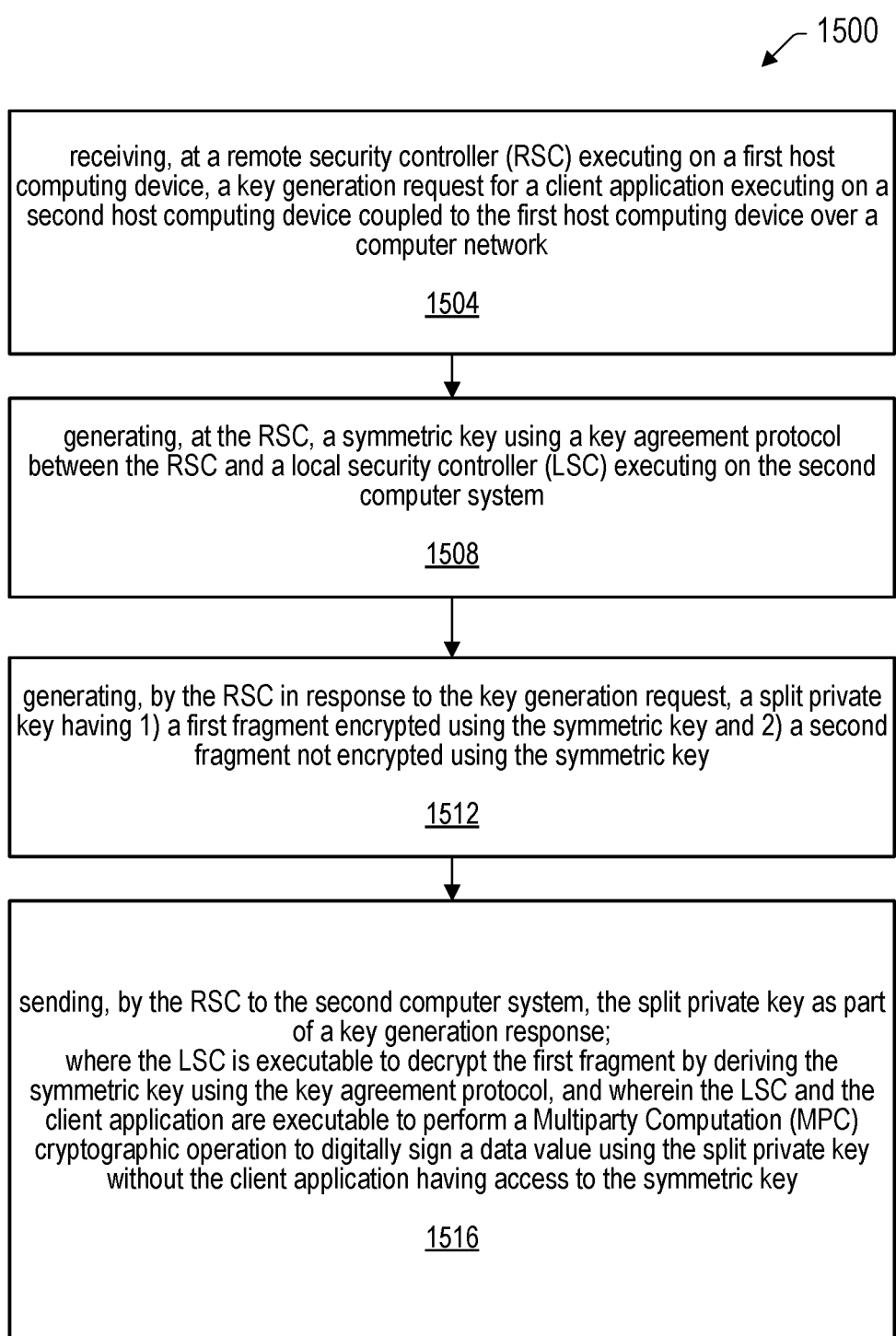
FIG. 15A is a flow diagram of one embodiment of a method 1500 performed by a remote security controller (RSC) for generating and distributing a split private key for a client application.
Figure 15B:
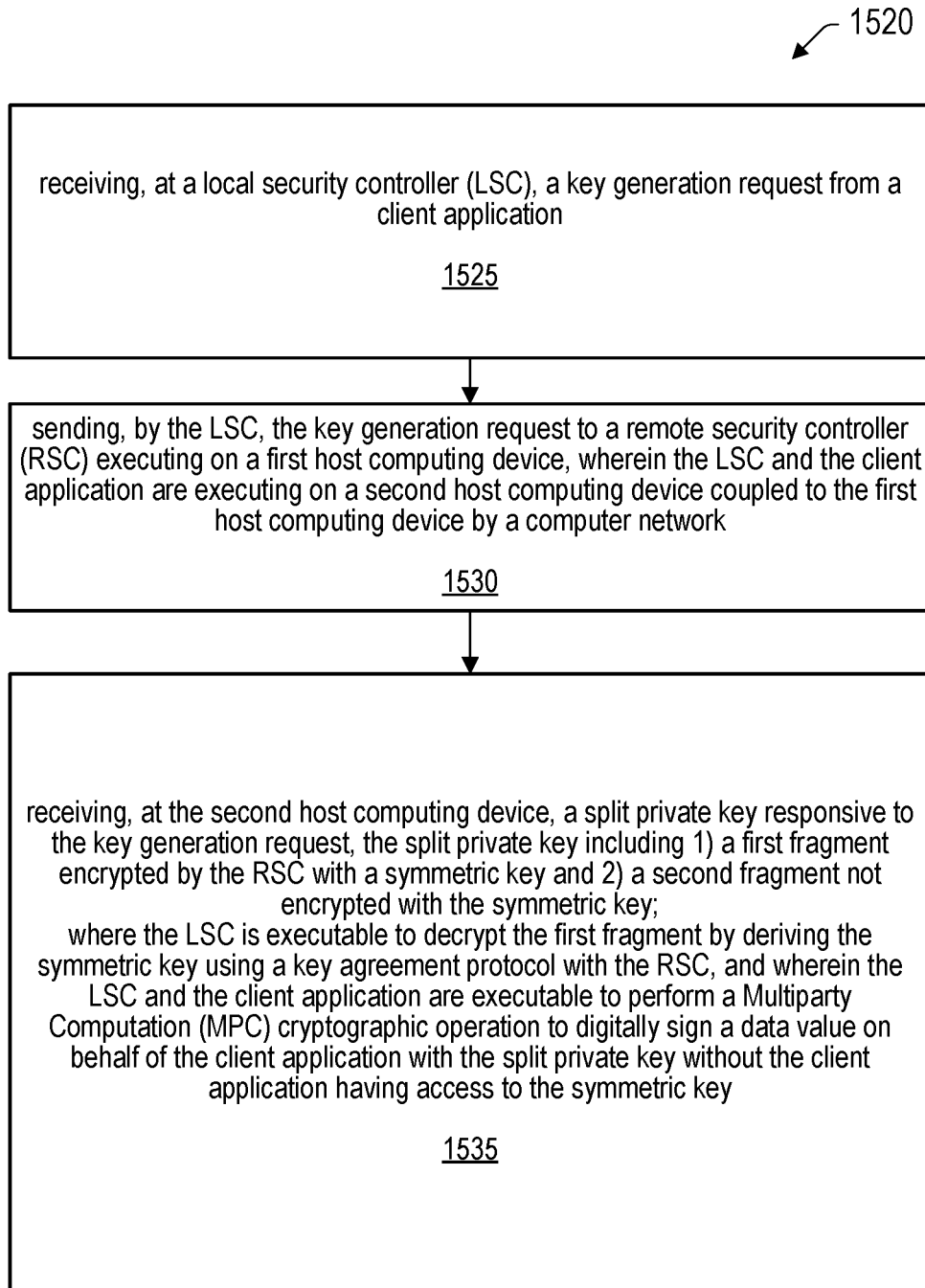
FIG. 15B is a flow diagram of one embodiment of a method 1520 performed by a local security controller (LSC) for generating and distributing a split private key for a client application.
Figure 15C:
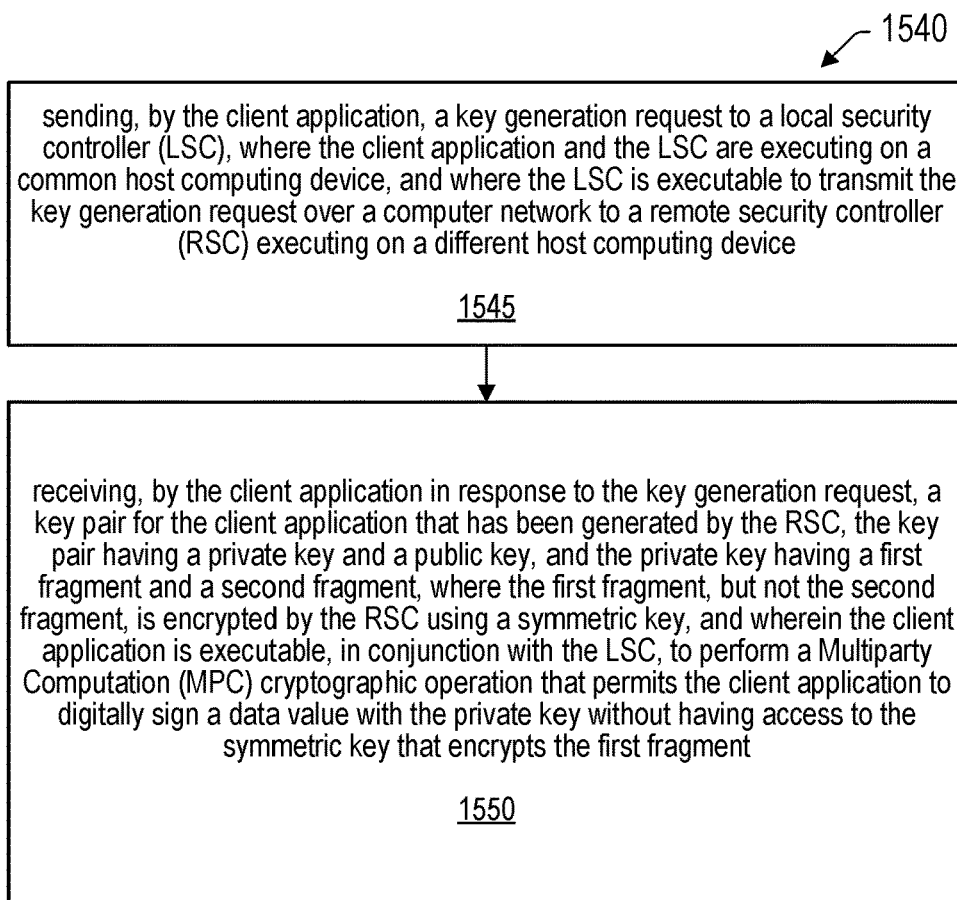
FIG. 15C is a flow diagram of one embodiment of a method 1540 for key generation that is performed by the client application.
Figure 15D:
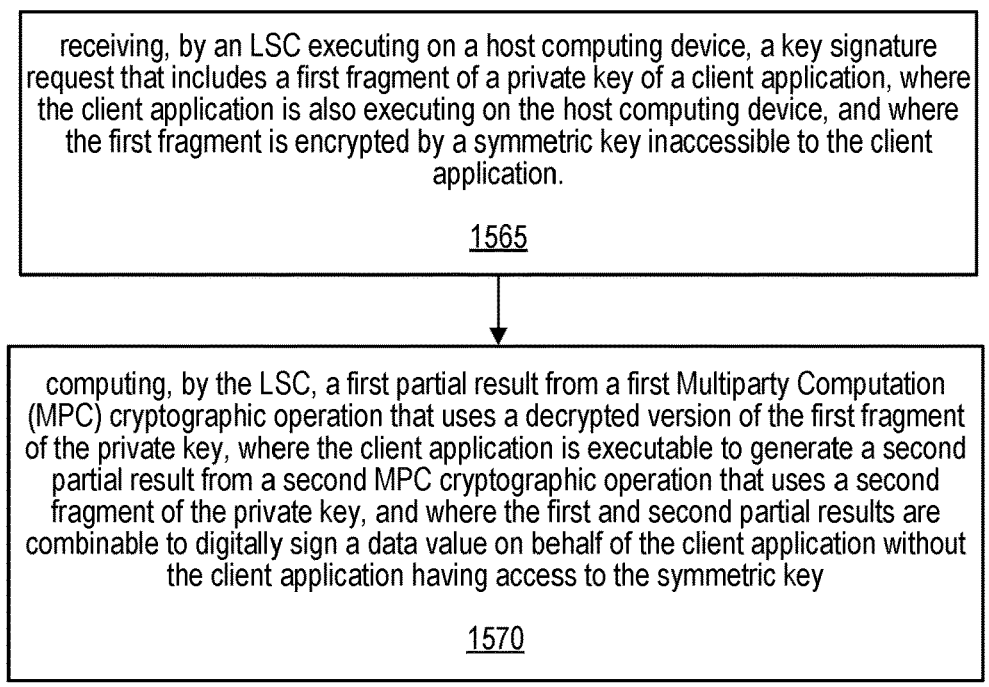
FIG. 15D is a flow diagram of one embodiment of a method 1560 performed by an LSC for signing a digital data value using a split private key.
Figure 15E:
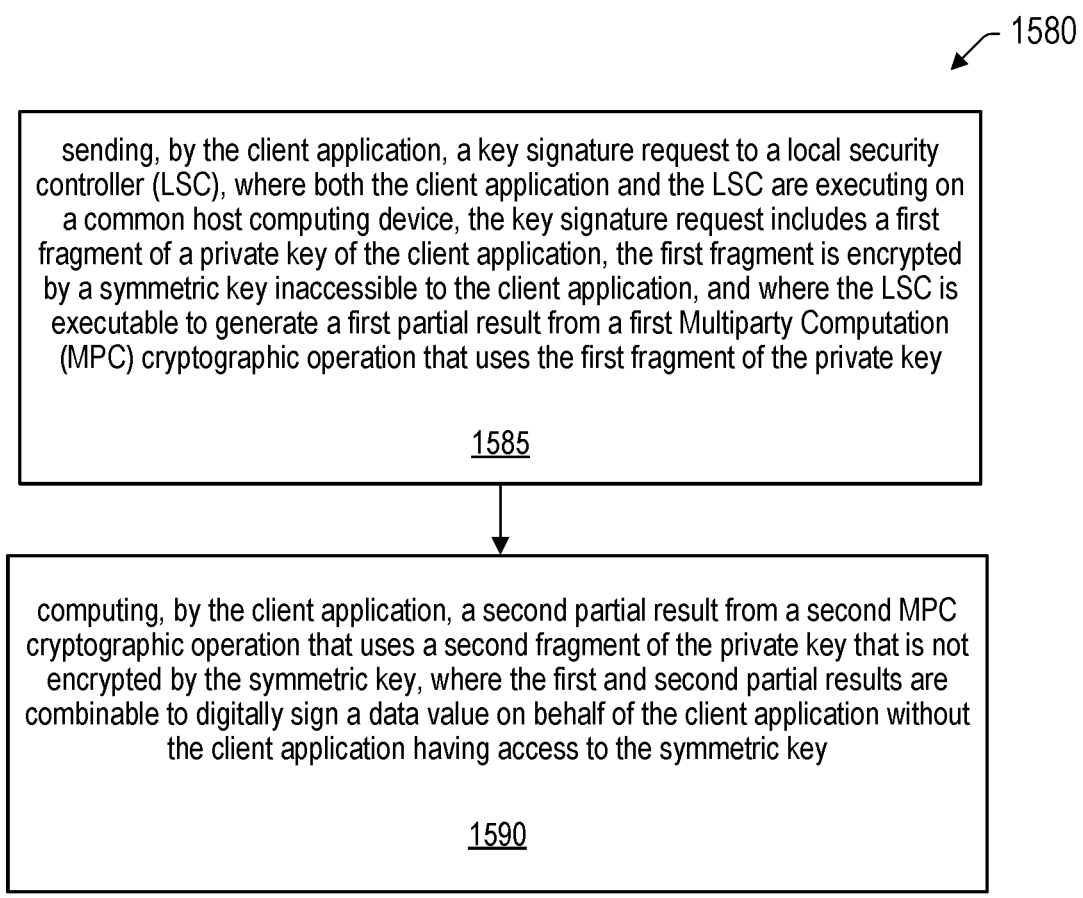
FIG. 15E is a flow diagram of one embodiment of a method 1580 performed by a client application for signing a digital data value using a split private key.

Operations associated with the embodiments of FIGS. 11-14 are now summarized with respect to FIGS. 15A-E. FIGS. 15A-C are directed to the key generation process, from the perspective of the RSC, the LSC, and the client application, respectively. FIGS. 15D-E are directed to the key usage process from the perspective of the LSC and the client application.

FIG. 15A is a flow diagram of one embodiment of a method 1500 performed by a remote security controller (RSC) for generating and distributing a split private key for a client application. Method 1500 begins in 1504, in which an RSC executing on a first host computing device receives a key generation request for a client application executing on a second host computing device coupled to the first host computing device over a computer network.

In 1508, the RSC generates a symmetric key using a key agreement protocol between the RSC and a local security controller (LSC) executing on the second computer system. A Diffie-Hellman technique such as elliptic-curve Diffie-Hellman (ECDH) is one example of a key agreement protocol. In 1512, the RSC generates, in response to the key generation request, a split private key that has a first fragment and a second fragment. The first fragment, but not the second fragment, is encrypted using the symmetric key. In 1516, the RSC sends the split private key to the second computer system as part of a key generation response. In various embodiments, portions of the split private key can be conveyed to the client application directly or to the LSC.

The LSC with which the RSC of method 1500 communicates is executable to decrypt the first fragment by deriving the symmetric key using the key agreement protocol. Moreover, the LSC and the client application are executable to perform a Multiparty Computation (MPC) cryptographic operation to digitally sign a data value using the split private key. Method 1500 is performed such that the client application does not have access to the symmetric key.

Numerous variations and additions to method 1500 are possible and contemplated. For example, with respect to the key agreement protocol of 1508 used by the RSC to generate the symmetric key, it may be based on 1) an RSC private key of an RSC key pair that also includes an RSC public key, and 2) an LSC public key of an LSC key pair that also includes an LSC private key. In order for the RSC to use the LSC public key, it is conveyed by the LSC (and thus received by the RSC) as part of a registration request from the LSC. On the LSC side, if the key generation response can include the RSC public key, the LSC can include program instructions that make it executable to decrypt the first fragment by using the key agreement protocol. In contrast to the RSC, the LSC can derive the symmetric key based on the RSC public key and the LSC private key.

The LSC key pair can, in various scenarios, be particular to a client application or it can apply to all client applications on that host computing device. In some embodiments, the RSC is configured to generate a unique symmetric key for each client application on a given host computing device. After sending the RSC public key to the LSC as part of the key generation response, the RSC can discard the LSC public key in some embodiments.

In some embodiments, the key generation response includes a certificate for the client application. This certificate may be signed by a private root key of the RSC. The certificate may include a public key for the client application that is paired with the split private key.

Method 1500 may also be repeated by the RSC for other LSCs. The RSC may be executable to register LSCs executing on a plurality of host computing devices and to respond to key generation requests from different client applications on a given host computing device. In some embodiments, the RSC is implemented within a key management service (KMS) of a computer system, which may also act as a certificate authority for entities within the computer system.

FIG. 15B is a flow diagram of one embodiment of a method 1520 performed by a local security controller (LSC) for generating and distributing a split private key for a client application. Method 1520 begins in 1525, where an LSC receives a key generation request from a client application. In 1530, the LSC sends the key generation request to a remote security controller (RSC) executing on a first host computing device. In method 1520, the LSC and the client application are both executing on a second host computing device coupled to the first host computing device by a computer network.

In 1535, the second host computing device receives, from the RSC, a split private key responsive to the key generation request. The split private key includes a first fragment and a second fragment. The first fragment, but not the second fragment, is encrypted by the RSC with a symmetric key.

The LSC of method 1520 is executable to decrypt the first fragment by deriving the symmetric key using a key agreement protocol with the RSC. Moreover, the LSC and the client application are executable to perform a Multiparty Computation (MPC) cryptographic operation to digitally sign a data value on behalf of the client application with the split private key. Method 1520 is performed without the client application having access to the symmetric key.

As with method 1500, various modifications and additions to method 1520 are contemplated. For example, the LSC may, in response to a reset event (e.g., a bootup or restart of the LSC), generate an LSC ephemeral key pair that includes an LSC ephemeral public key and an LSC ephemeral private key. The LSC may then send the LSC ephemeral public key to the RSC to use as part of the key agreement protocol to generate the symmetric key.

Then, in response to the key generation request, the LSC may receive an RSC ephemeral public key generated as part of an RSC ephemeral key pair that also includes an RSC ephemeral private key. (The RSC ephemeral key was used by the RSC as part of the key agreement protocol to generate the symmetric key.) The LSC uses the LSC ephemeral private key and the RSC ephemeral public key to derive the symmetric key.

Note that the keys used by the RSC and LSC do not have to be ephemeral. Other variations are possible, including ones in which the keys are long-lived, which allows keys to persist across restarts. In some embodiments, the LSC is executable to derive a unique symmetric key for each of a plurality of client applications executing on the second host computing device.

In order to use the split private key to sign a digital data value, the LSC may, in some embodiments, receive, from the client application, a key signature request that includes the first fragment of the private key. The LSC can then decrypt the first fragment using a version of the symmetric key derived by the LSC using the key agreement protocol, and subsequently compute a first partial result from a first MPC cryptographic operation that uses a decrypted version of the first fragment. The client application is executable to generate a second partial result from a second MPC cryptographic operation that uses the second fragment of the private key. The first and second partial results are combinable to digitally sign a data value on behalf of the client application without the client application having access to the symmetric key.

FIGS. 15A-B have described the flow for key generation from the RSC and LSC perspectives. FIG. 15C is a flow diagram of one embodiment of a method 1540 for key generation that is performed by the client application.

In 1545, the client application sends a key generation request to a local security controller (LSC). The client application and the LSC both are both executing on a common host computing device. The LSC with which the client application interacts in method 1540 is executable to transmit the key generation request over a computer network to a remote security controller (RSC) executing on a different host computing device.

In 1550, the client application receives, in response to the key generation request, a key pair for the client application generated by the RSC. The key pair has a private key and a public key. The private key in turn includes a first fragment and a second fragment. The first fragment, but not the second fragment, is encrypted by the RSC using a symmetric key.

The client application of method 1540 is executable, in conjunction with the LSC, to perform a Multiparty Computation (MPC) cryptographic operation that permits the client application to digitally sign a data value with the private key without having access to the symmetric key that encrypts the first fragment.

While FIGS. 15A-C are directed to the key generation process, FIGS. 15D-E are directed to the use of a split private key to sign a digital data value. FIG. 15D is a flow diagram of one embodiment of a method 1560 performed by an LSC for signing a digital data value using a split private key. Method 1560 begins in 1565, in which an LSC executing on a host computing device receives a key signature request that includes a first fragment of a private key of a client application. The client application is also executing on the host computing device. The first fragment is encrypted by a symmetric key inaccessible to the client application.

In 1570, the LSC computes a first partial result from a first Multiparty Computation (MPC) cryptographic operation that uses a decrypted version of the first fragment of the private key. The client application of method 1560 is executable to generate a second partial result from a second MPC cryptographic operation that uses a second fragment of the private key. Additionally, the first and second partial results are combinable to digitally sign a data value on behalf of the client application without the client application having access to the symmetric key.

FIG. 15E is similar to FIG. 15D, but it describes the key usage process from the perspective of the client application rather than the LSC. FIG. 15E is a flow diagram of one embodiment of a method 1580 performed by a client application for signing a digital data value using a split private key. Method 1580 begins with 1585, in which the client application sends a key signature request to a local security controller (LSC). Both the client application and the LSC are executing on a common host computing device. The key signature request includes a first fragment of a private key of the client application. This first fragment is encrypted by a symmetric key inaccessible to the client application. The LSC is executable to generate a first partial result from a first Multiparty Computation (MPC) cryptographic operation that uses the first fragment of the private key.

In 1590, the client application computes a second partial result from a second MPC cryptographic operation that uses a second fragment of the private key that is not encrypted by the symmetric key. The first and second partial results are combinable to digitally sign a data value on behalf of the client application without the client application having access to the symmetric key.

The split-key paradigm thus strengthens the security of client applications' private keys. If a client application is compromised, at most the attacker can gain access to that fragment of the key that is decryptable (or is already decrypted) by the client application as the other fragment is decryptable only by the security controller. If, on the other hand, the security controller is compromised after key generation, it will not ever receive the decryptable fragment that was previously sent to the client application. In both scenarios, the private key is protected unless the client application and security controller are both compromised.

Local Private Key Generation Using MPC

In the embodiments previously discussed in this disclosure, a private key is generated by a security controller and then split into fragments, with each fragment going to a different node. One of the fragments is encrypted using a symmetric key that is not accessible to the client application. For example, the last section described a paradigm in which a remote security controller (RSC) generates and splits a private key, one fragment of which is kept in the clear and the other of which is decryptable by a local security controller (LSC) co-located on a given host computing device with the client application.

This section also employs the use of an RSC, LSC, and client application as described, for example, with respect to FIG. 11. That is, in the embodiments described in this section, an LSC and one or more client applications are executing on a given host computing device. The given host computing device is coupled to an RSC over a computer network.

But the processes for registration (FIG. 16) and key generation (FIGS. 17 and 18A-C) in the embodiments described in this section differ from those of the prior section. In this section, a client application's private keys are generated by the LSC and client application using MPC, resulting in fragments that are never both accessible by a single process, as the client application and the LSC run with different user identities at the operating-system level to achieve process isolation. (It may be desirable to configure these systems such that very few users will be able to execute commands with the privileges of both the client application and LSC. While there may need to be a number of administrative users with access to client applications, access to the LSC can be highly restricted.) Accordingly, these key fragments can be kept in the clear in system memory—one fragment in the client application's memory and the other in the LSC's memory. The RSC is not involved in private key generation in the embodiments described in this section, but instead may act as a certificate authority. The method for the LSC and the client application to jointly sign a data value is analogous to the method employed by the LSC and the client application in the prior section (although there is no need to decrypt a private key fragment with a symmetric key). But the method for obtaining a certificate for the client application is different.

Figure 16:
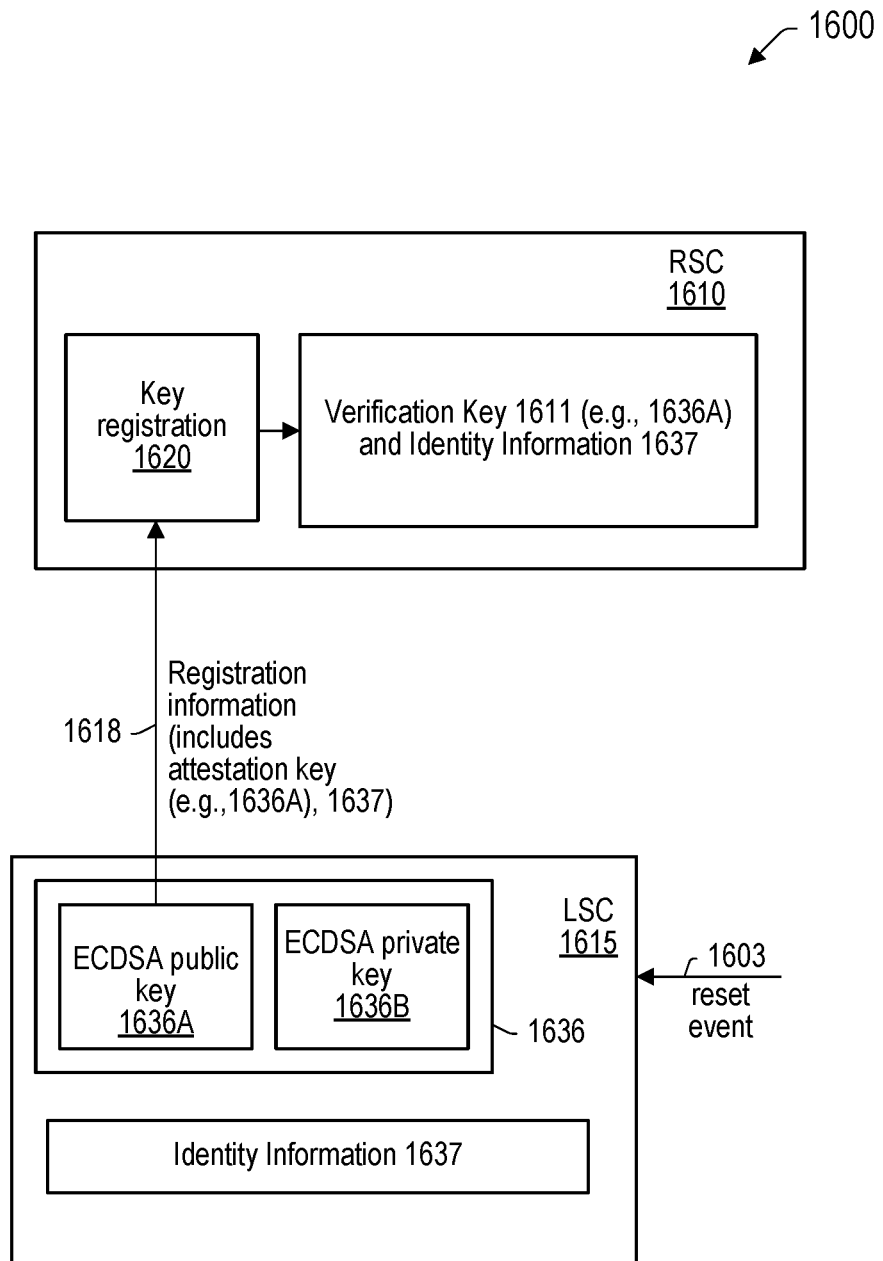
FIG. 16 is a block diagram illustrating one embodiment of a registration process between an RSC and an LSC that precedes MPC-based key generation.

FIG. 16 is a block diagram illustrating one embodiment of a registration process between an RSC and an LSC. This process occurs after restart, and is thus part of an initialization sequence performed by the LSC before it can handle any cryptographic-related requests from client applications. Accordingly, this registration process precedes MPC-based key generation discussed in subsequent Figures. In the paradigm of the last section (see FIG. 12), the registration process involved exchanging keys for a key agreement protocol. Here, the registration process involves exchanging information to facilitate signature checking, and thus preventing a situation in which a client application attempts to bypass the LSC's involvement in key generation.

In one embodiment, in response to a reset event 1603 (e.g., a boot up or restart), LSC 1615 may generate an elliptic-curve Digital Signature Algorithm (ECDSA) signing key pair 1636, which includes ECDSA public key 1636A and ECDSA private key 1636B. The nature of key pair 1636 is that any signature produced using private key 1636B can be verified using public key 1636A. In one embodiment, key pair 1636 remains in effect until a next reset event 1603 occurs. In other embodiments, key pair 1636 may be more long-lived. If the host computing device of LSC 1615 has Trusted Platform Module (TPM) technology, which supports longer-term cryptographic key storage, it may not be necessary to regenerate keys periodically or on restart.

As shown, LSC 1615 also stores identity information 1637. This is any type of information that can be used to establish the identity of the entity requesting registration with RSC 1610. In some implementations, information 1637 is "cloud-native identity information." Different platforms will have different means of establishing trust with a security principal (here, the LSC), and thus the precise format of identity information 1637 will vary in different implementations. The use of identity information 1637 in the registration process allows RSC 1610 to determine (and potentially limit) what processes are allowed to register.

As shown, the registration process involves LSC 1615 sending registration information 1618 to RSC 1610. Registration information 1618 includes both a verification key and identity information 1637. The verification key in the depicted embodiment is ECDSA public key 1636A. As will be explained, the verification key will subsequently be used to verify the validity of a token from LSC 1615. In some embodiments, the token is a signature made by LSC 1615 (using an attestation key such as ECDSA private key 1636B). The token may be returned during a certificate signing request for a client application that is executing on the same host computing device as LSC 1615.

In the depicted embodiment, an asymmetric key pair is used for the verification and attestation keys. An advantage in such an approach is that only one entity (LSC 1615) has the "key material" (i.e., the private key), and thus only one entity needs to secure it. In a symmetric-key-based scheme, both entities need to secure the key material. This can be accomplished using HMAC, for example. As part of the registration process, LSC 1615 would provide the symmetric key to the RSC instead of the public key. The subsequent attestation by LSC 1615 would constitute message authentication codes as opposed to signatures in such embodiments.

At RSC 1610, key registration module 1620 receives registration information 1618 and stores it for subsequent use during a CSR verification process.

As noted, in some embodiments, every time a given host computing device (i.e., a machine on which an LSC and one or more client applications are running) starts or restarts, a new ECDSA key pair is generated. Thus, the registration process of FIG. 16 may be performed anew upon each restart. As has been described, RSC 1610 is able to operate in conjunction with multiple different LSCs 1615, and thus may store a number of different verification keys for different host computing devices.

Figure 17:
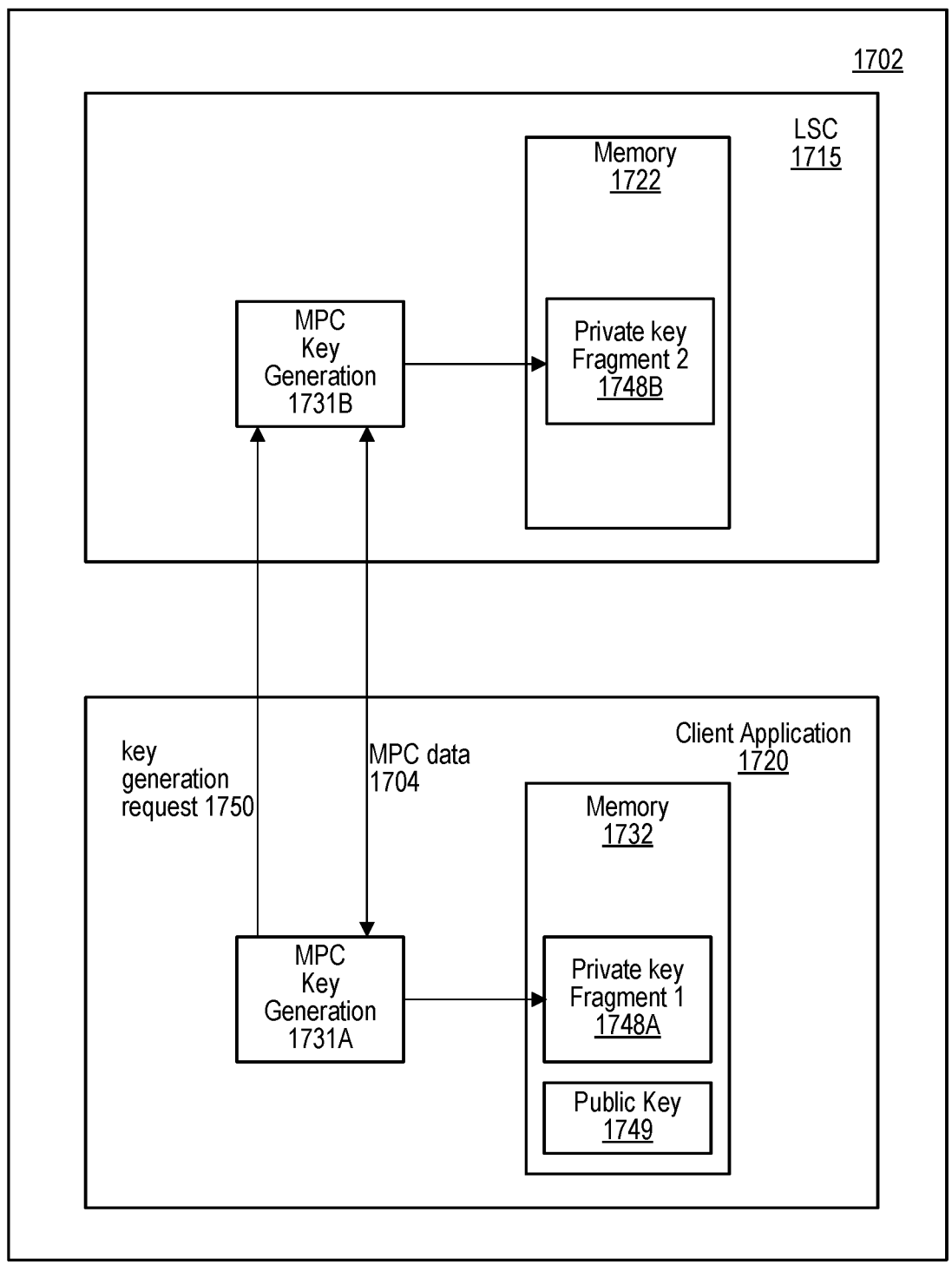
FIG. 17 is a block diagram illustrating one embodiment of MPC private key generation by an LSC and a client application.

FIG. 17 is a block diagram of one embodiment of a key generation process. As depicted, host computing device 1702 includes both an LSC 1715 and a client application 1720. These are two distinct processes running with different operating-system-level identities that have their own volatile memory space—memory space 1722 for LSC 1715 and memory space 1732 for client application 1720. Each memory space is accessible by its corresponding process. Thus, LSC 1715 cannot access memory space 1732, and client application 1720 cannot access memory space 1722. The processes can, of course, communicate and choose what information to share with one another. But these processes do not have unfettered access to one another's memory spaces.

The embodiments of this section take advantage of this separation of memory spaces. In previously described embodiments, an RSC on a remote host computing device generates a key pair for a client application, and splits the resulting private key. Here, client application 1720 can generate public key 1749, and client application 1720 and LSC 1715 perform distributed key generation to create a split private key (e.g., using asymmetric EC key generation). In the depicted embodiment, this joint process may be initiated by MPC key generation module 1731A on client application 1720, which sends key generation request 1750 to MPC key generation module 1731B on LSC 1715. Thereafter, modules 1731A and 1731B can communicate using an MPC key generation process to jointly generate a private key 1748. See, e.g., Lindell, et al., Fast Secure Multiparty ECDSA with Practical Distributed Key Generation and Applications to Cryptocurrency Custody, Oct. 14, 2018.

The result of this communication (which is represented in FIG. 17 by MPC data 1704) is the creation of two private key fragments of a private key 1748. Client application 1720 has generated private key fragment 1 (indicated by reference numeral 1748A), while LSC 1715 has generated private key fragment 2 (reference numeral 1748B). In keeping with MPC principles, LSC 1715 has no access to fragment 1, and client application 1720 has no access to fragment 2. Fragments 1748A-B have thus been generated through joint communication, but each fragment is known only to its corresponding process.

In previously described embodiments, one of the private key fragments is encrypted remotely and sent to the client application, but one fragment is encrypted such that the client application does not have access to both fragments. The embodiments described in this section do not export either private key fragment. That is, private key fragment 1 remains within memory 1732 and is not sent elsewhere, and the same is true with respect to private key fragment 2 and memory 1722. For this reason, fragments 1748 can be stored in the clear (i.e., not in encrypted format). The fragments can be further protected using hardware architectures that include secure enclaves such as INTEL Software Guard Extensions (SGX). Fragments 1748 are not retained persistently within host computing device 1702. Rather, as noted above, memories 1722 and 1732 are volatile. Accordingly, if the processes for LSC 1715 or client application 1720 terminate (or if power is removed from 1702), fragments 1748 are no longer accessible. The separation and volatile nature of memories 1722 and 1732 thus allow fragments 1748 to be maintained in the clear.

As with all discussion of private key fragments in the present disclosure, there is no implication that a particular fragment corresponds to some fixed percentage of the entire private key. For example, a length of fragment 1748A is not necessarily 50% of a length of the entire private key 1748. In different embodiments, the lengths of the fragments can differ from one another. In fact, in some embodiments, MPC key generation modules 1731 can execute to randomly vary the respective lengths of fragments 1748 each time a private key is generated. Thus, in response to a first key generation request 1750, fragments 1748A-B may be generated to be of equal length, while in response to a second key generation request 1750, fragment 1748A may be generated to be 60% of the overall private key length, with fragment 1748B constituting the remaining 40%.

With the split private key now in existence, the process of obtaining an accompanying certificate commences with the generation of a certificate signing request (CSR) by the client application. During the preparation of the CSR in some embodiments, the CSR may include two signatures. The first signature is jointly performed by client application 1720 and LSC 1715 using the newly created split private key. The first signature demonstrates possession of the private key that corresponds to the public key that will also be included in the certificate. The second signature is performed by LSC 1715 using an attestation key (e.g., ECDSA private key 1636B). The second signature will subsequently be checked by the RSC using the verification key described in FIG. 16 (e.g., ECDSA public key 1636A). The second signature constitutes an attestation by LSC 1715 that the private key used to perform the first signature was generated using MPC techniques. This approach forecloses the likelihood that a client application is attempting to obtain a certificate for a private key not produced using MPC.

More generally, in order to obtain a certificate from the certificate authority (RSC), client application 1720 needs to complete a CSR (which will signed by private key 1748 using an MPC process) as well as a "token" that is supplied by LSC 1715. Client application 1720 will supply the completed CSR, the token, and (potentially) some sort of identity information to the certificate authority to be issued the certificate.

Figure 18A:
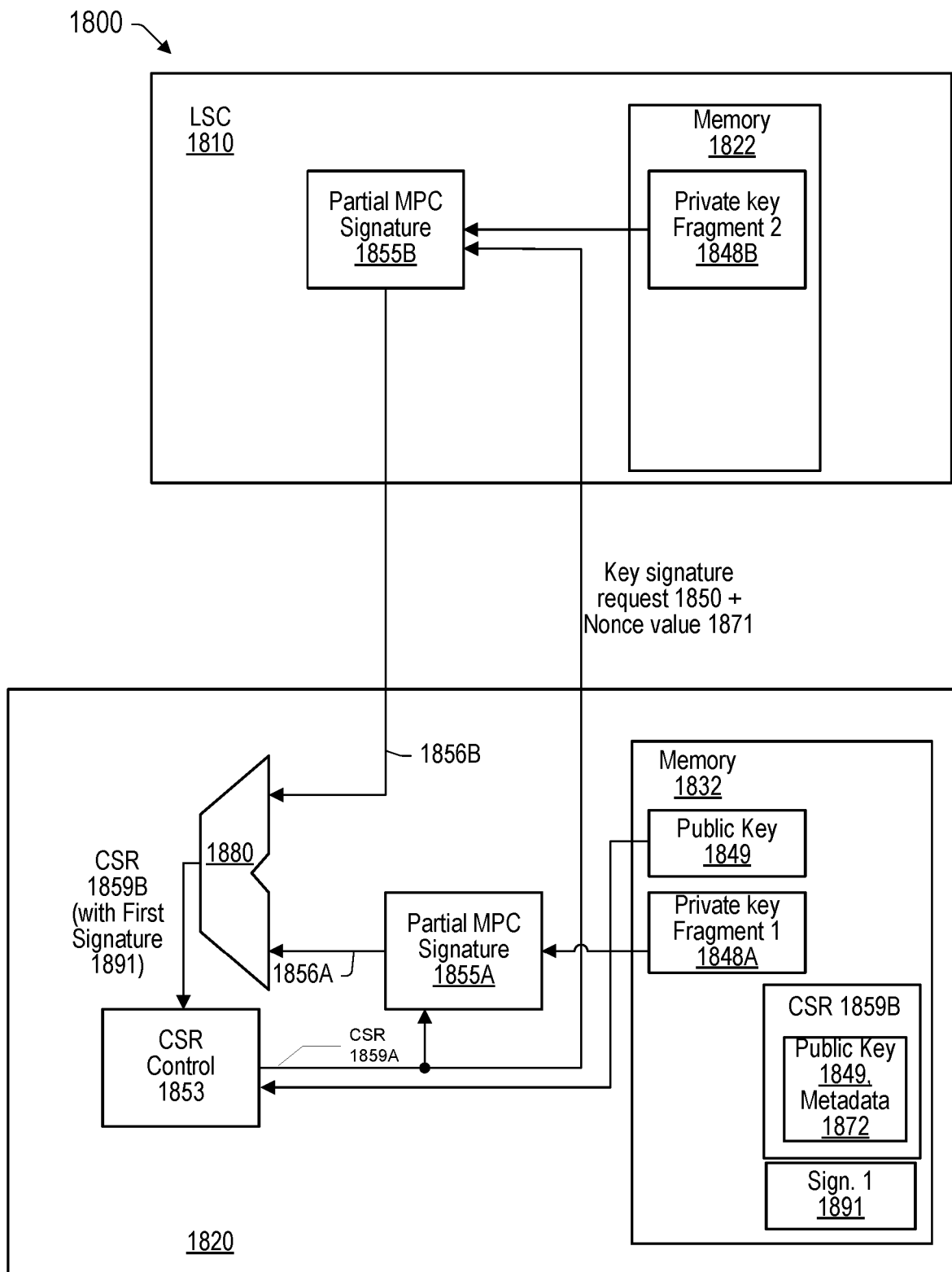
FIG. 18A is a block diagram illustrating one embodiment of a client application interacting with an LSC to sign a certificate signing request (CSR) with a split private key.

FIG. 18A is a block diagram of one embodiment of system 1800, in which a client application and an LSC interact to jointly sign a CSR with the client application's private key. This process is similar to the key signature process described above with respect to FIG. 14. Since this is an MPC operation, both the LSC and the client application need to be involved any time a signature generation is involved as the private key is distributed between those two parties. As will be described in FIGS. 18A-C, the CSR generation process is controlled by CSR control module 1853 within client application 1820.

Module 1853 begins by generating a CSR 1859A, which includes client application 1820's public key 1849 and various other payload information, which may include metadata 1872 (e.g., key permission information, etc.). Module 1853 then conveys CSR 1859A to partial MPC signature module 1855A within client application 1820 and partial MPC signature module 1855B within LSC 1815. Module 1855A receives private key fragment 1 (1848A) as an input along with CSR 1859A to produce first partial signature 1856A. Similarly, partial MPC signature module 1855B receives key fragment 2 (1848B) as an input along with CSR 1859A to produce second partial signature 1856B.

Partial signatures 1856A-B are then combined to produce CSR 1859B, which is now signed with first signature 1891. The combining functionality (represented by reference numeral 1880) is shown as being located in client application 1820, but could also be located within LSC 1815 in other embodiments. At the end of this step, CSR 1859B has now been signed by private key 1848, which is split between client application 1820 and LSC 1815.

As noted, the first signature demonstrates possession of private key 1848, which corresponds to public key 1849. Subsequently, the completed CSR 1859 will be presented to the RSC, which acts as a certificate authority. At that time, the RSC will be able to verify that client application 1820 possesses private key 1848 by verifying first signature 1891 using public key 1849.

Figure 18B:
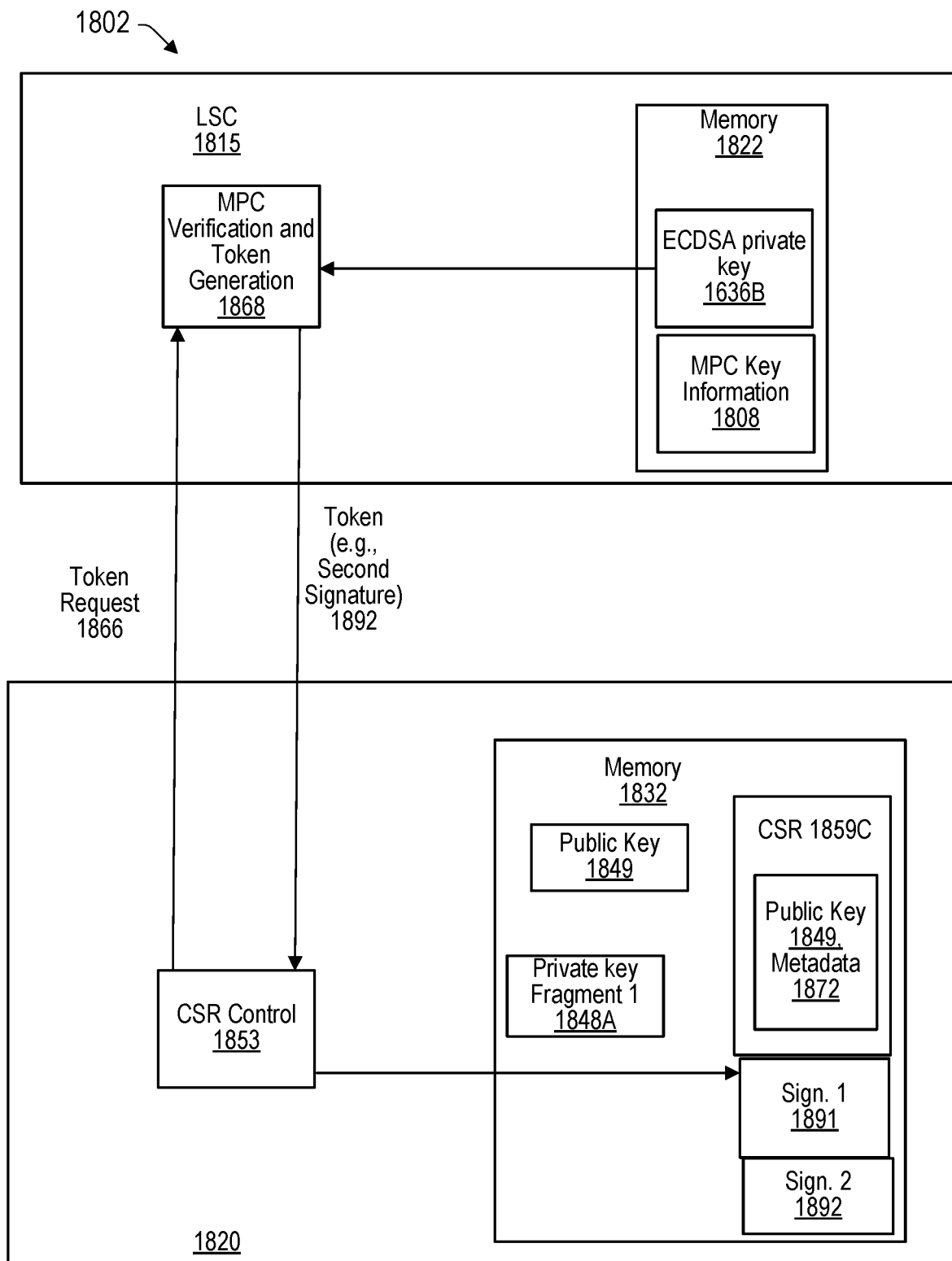
FIG. 18B is a block diagram illustrating one embodiment of a client application requesting a signed token from an LSC to include with a CSR.

The CSR generation process continues as shown in FIG. 18B, which illustrates one embodiment of host computing device 1802, in which LSC 1815 returns a token to client application. As has been noted, this token (which may be a second signature in one embodiment) is an indication or attestation by LSC 1815 that private key 1848 used to generate first signature 1891 was generated using MPC techniques. The inventors have recognized that without this attestation, a client application could generate a non-MPC private key by itself and use the private key to sign a CSR and obtain a certificate. The CA (the RSC) would have no way of determining how this private key was generated when determining whether to issue a certificate to the client application.

Note that this uncertainty is due to the delegation of private key generation from the RSC to the combination of the LSC and the client application. In embodiments described in the preceding sections, a security controller generated the private key—there was no option for this step to be performed by the client application. There was no question of the provenance of a client application's private key in these embodiments. In the embodiments being described in this section, however, the RSC does not generate private keys for client applications.

The inventors recognized this potential security problem and have thus included an attestation step. Generally speaking, client application 1820 issues a token request 1866 to LSC 1815. In response, LSC 1815 determines if token request 1866 relates to an MPC-backed private key that LSC 1815 helped generate in conjunction with client application 1820. If so, LSC 1815 returns a token to client application 1820. Client application 1820 can then present this token to the certificate authority in order to obtain a certificate. In some embodiments, the token is a signed object. In other embodiments, the token could be a message authentication code. Generally speaking, the token can be any information that client application 1820 can present to the certificate authority. The CA can verify that the token is legitimate (i.e., that it is from LSC 1815). Furthermore, the fact that the token was issued is an indication that LSC 1815 has confirmed that the CSR relates to an MPC-backed private key.

As noted, in some embodiments, the token may be signed by LSC 1815. Consider the discussion of FIG. 16, where it was noted that whenever a LSC restarts, it registers with the RSC by providing a verification key—for example, an ECDSA public key. The RSC maintains this information during the current startup of the LSC. (Thus, in some embodiments, every time the LSC restarts, the old verification key will be overwritten at the RSC.) The verification key works with an attestation key (e.g., an ECDSA private key).

Client application 1820 sends CSR 1859B, which is now signed with first signature 1891 (which was generated using private key 1848), to LSC 1815 as part of token request 1866. Another name for token request 1866 is an attestation request, as the purpose of the request is to ask LSC 1815 to attest to CSR 1859B by determining whether private key 1848 is an MPC-backed key (i.e., whether it was generated using MPC techniques), and, if so, performing an attestation signature.

The precise manner in which LSC 1815 verifies that private key 1848 is an MPC-backed key may vary. This process may be aided by information in memory 1822 (as exemplified by MPC key information 1808) regarding MPC private keys that LSC 1815 has helped generate. In the illustrated embodiment, MPC key information 1808 might include information indicating that LSC 1815 has helped generate an MPC-backed key for public key 1849.

When MPC verification and signature module 1868 in LSC 1815 receives token request 1886 for CSR 1859B, it can determine that the public key specified in CSR 1859B (public key 1849) matches a public key specified in MPC key information 1808. (Alternately, token request 1886 may be referred to as an "attestation request.") In some implementations, this check alone might be sufficient for LSC 1815 to determine that private key 1848 that was used to sign CSR 1859B is MPC-backed. In another implementation, module 1868 might take the extra step of verifying the CSR. (This can be done by hashing the CSR and then checking the result using public key 1849.)

Whatever criteria is used by module 1868, LSC 1815 makes a determination in response to request 1866 whether to attest to the MPC-based nature of private key 1848. If request 1866 fails, an error message may be returned to client application 1820. If request 1866 passes, module 1868 uses its attestation key (e.g., ECDSA private key 1636B) to sign an object to return to client application 1820 as the requested token. In one embodiment, the object is CSR 1859B, which includes first signature 1891. The returned token is a version of CSR 1859B that is signed by private key 1636B. In this implementation, CSR 1859C has been signed using private key 1848 (resulting in first signature 1891) and ECDSA private key 1636B (resulting in second signature 1892). In other embodiments, the object is public key 1849; the returned token is thus the CSR (which includes first signature 1891), and public key 1849 (as signed by ECDSA private key 1636B).

As noted, in some cases, the token may be signed by LSC 1815. As will be seen, this signature allows the RSC to recognize the attestation as coming from the LSC. But in other implementations, other methods can be used, such as message authentication codes.

Whatever the nature of the token, client application 1820 is executable to recognize CSR 1859C as an attestation from LSC 1815. Once this is received, the CSR is complete.

Figure 18C:
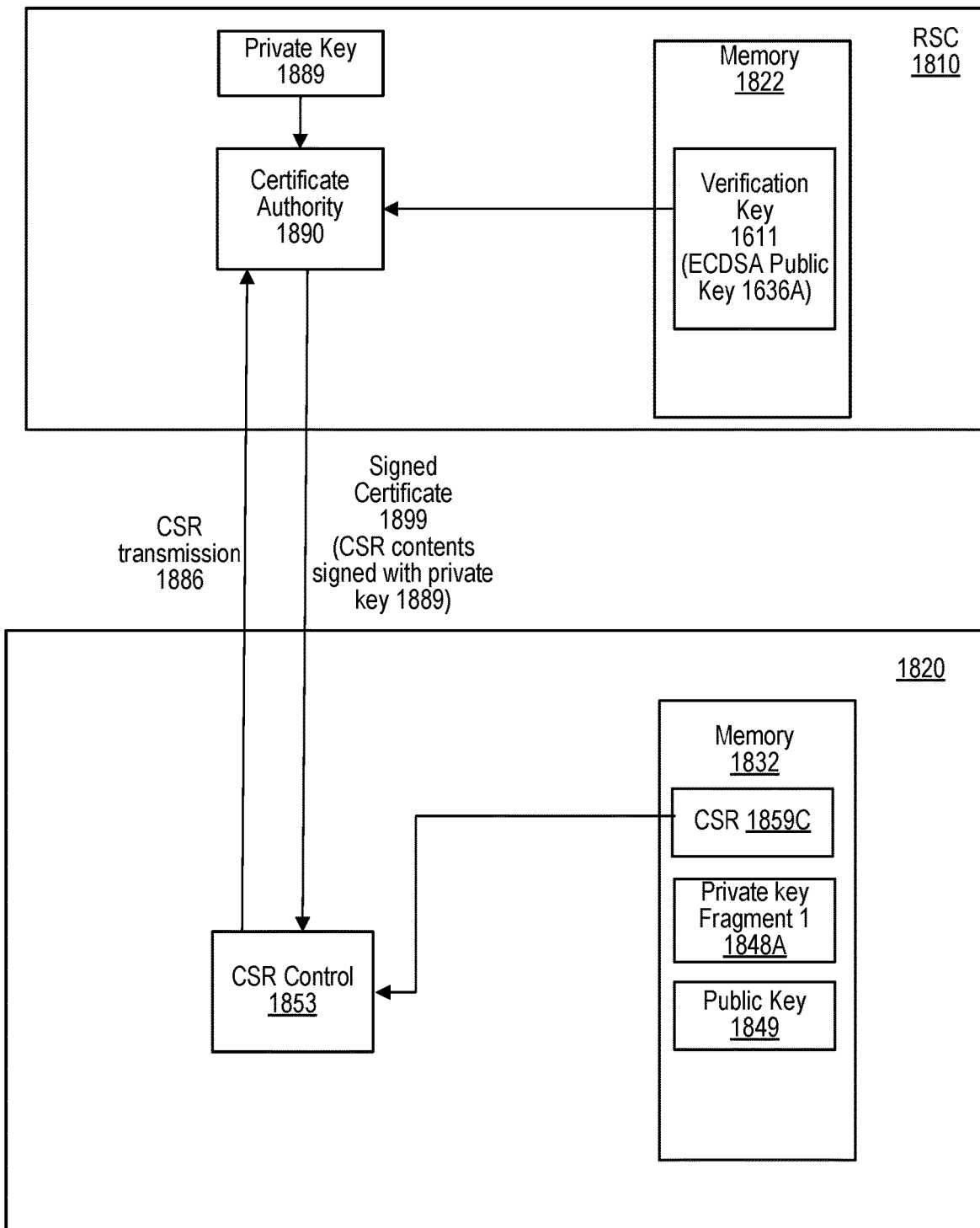
FIG. 18C is a block diagram of one embodiment illustrating a client sending a completed CSR to an RSC.

FIG. 18C illustrates one embodiment of a CSR being sent from client application 1820 to RSC 1810 in order to obtain a certificate. RSC 1810 acts as the certificate authority in this embodiment. After the attestation by LSC 1815, client application 1820 now has CSR 1859C in memory, which includes the CSR payload (which includes public key 1849 and metadata 1872), and is signed with first signature 1891. Client application 1820 also has the token (e.g., second signature 1892). With the completed CSR in hand, CSR control module 1853 can now initiate CSR transmission 1886, which includes CSR 1859C, to RSC 1810.

Certificate authority module 1890 in RSC 1810 can now evaluate CSR transmission 1886. First, module 1890 verifies the token. If the token was signed by LSC 1815 using an attestation key, the token can be verified by using the verification key (e.g., ECDSA public key 1636A) previously received by RSC 1810 from LSC 1815 during the registration process. Because the token is interpreted as an indication whether the private key included in CSR 1859C was created using MPC techniques, verification of this signature constitutes proof to RSC 1810 of the MPC provenance of the private key included in CSR 1859C. The token can also be verified by other means, such as through message authentication codes.

Second, module 1890 verifies first signature 1891 included in CSR transmission 1886 using public key 1849. Where the verification of second signature 1892 constituted proof of the MPC-backed nature of the private key, verification of first signature 1891 constitutes proof that client application 1820 is in possession of private key 1848 that corresponds to public key 1849. With both signatures verified, RSC 1810 can issue certificate 1899 using CA private key 1889. Client application 1820 is now in possession of public key 1849, private key fragment 1 (1848A), and certificate 1899, while LSC 1815 is in possession of private key fragment 2 (1848B).

In some embodiments, CSR transmission 1886 may include identity information for client application 1820. This may be, for example, cloud-native identity information that permits RSC 1810 to determine the entity from which the CSR transmission originated. Thus, RSC can determine, in some embodiments, the identity of the entity sending the CSR, that the private key in the CSR is MPC-backed, and that the entity sending the CSR is in possession of the private key associated with the public key included in the CSR.

Client application 1820 and LSC 1815 can now use this information to authenticate to other entities. For example, client application 1820 may receive a challenge with a nonce value. Client application 1820 and LSC can jointly sign the nonce in the same way that the CSR was signed with first signature 1891 in FIG. 18A.

Figure 19A:
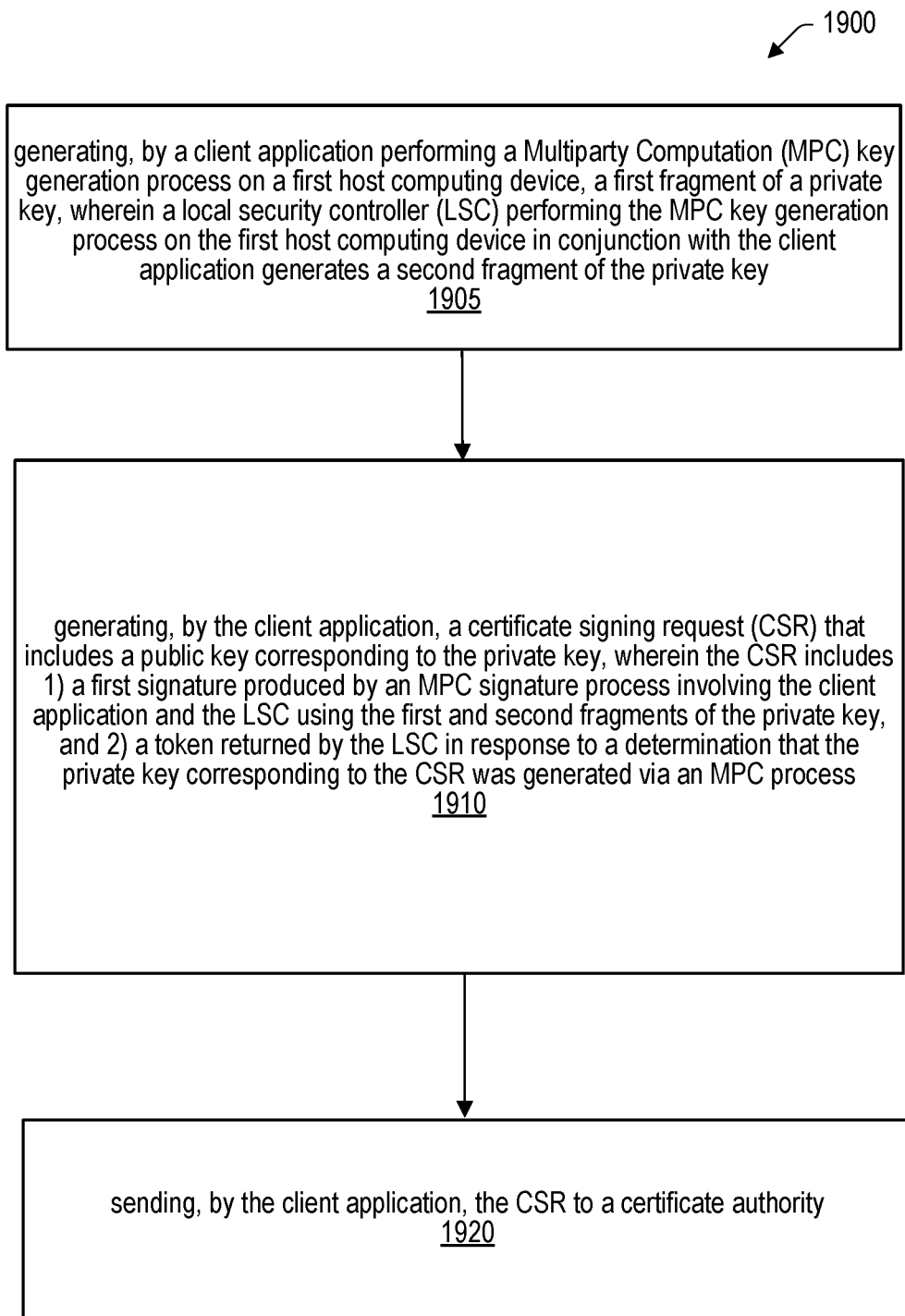
FIG. 19A is a flow diagram of one embodiment of a method 1900 performed by a client application for generating a split private key in conjunction with an LSC.
Figure 19B:
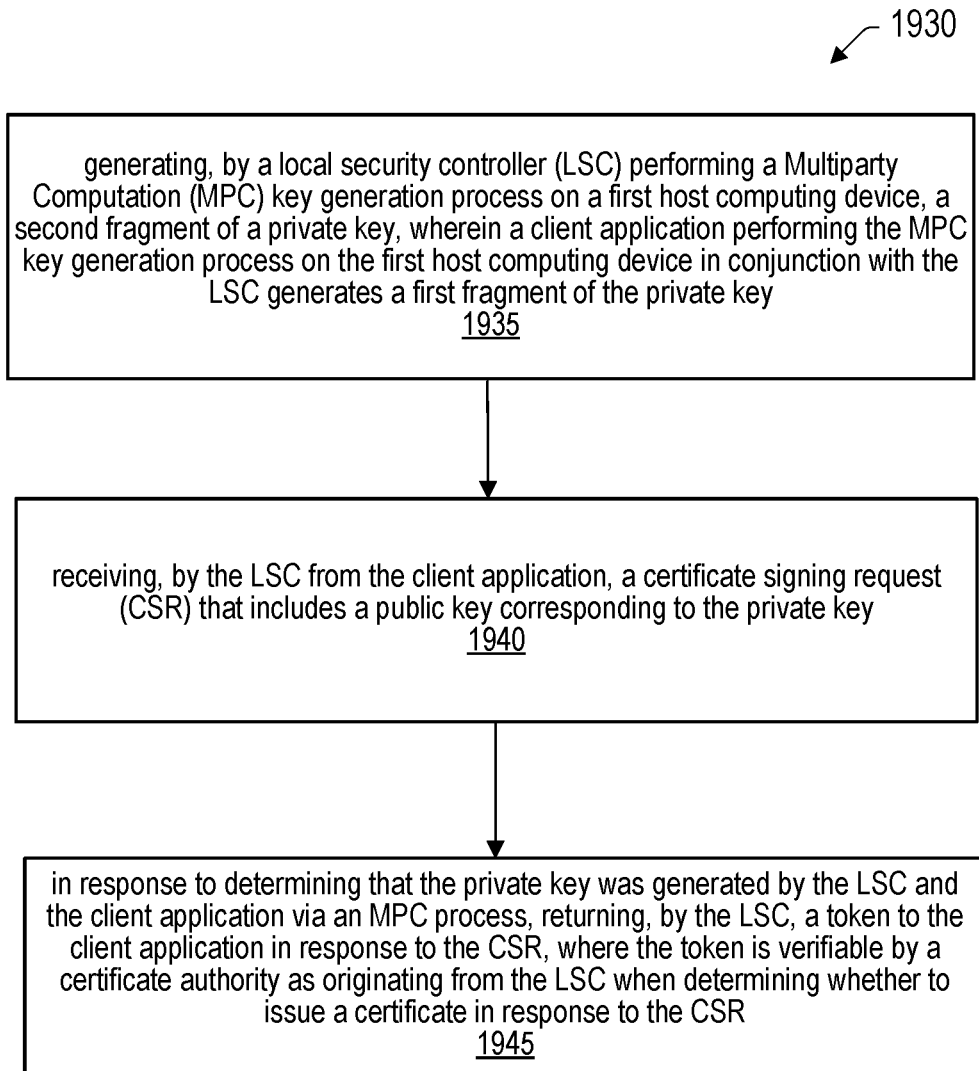
FIG. 19B is a flow diagram of a method 1930 performed by an LSC for generating a split private key in conjunction with a client application.
Figure 19C:
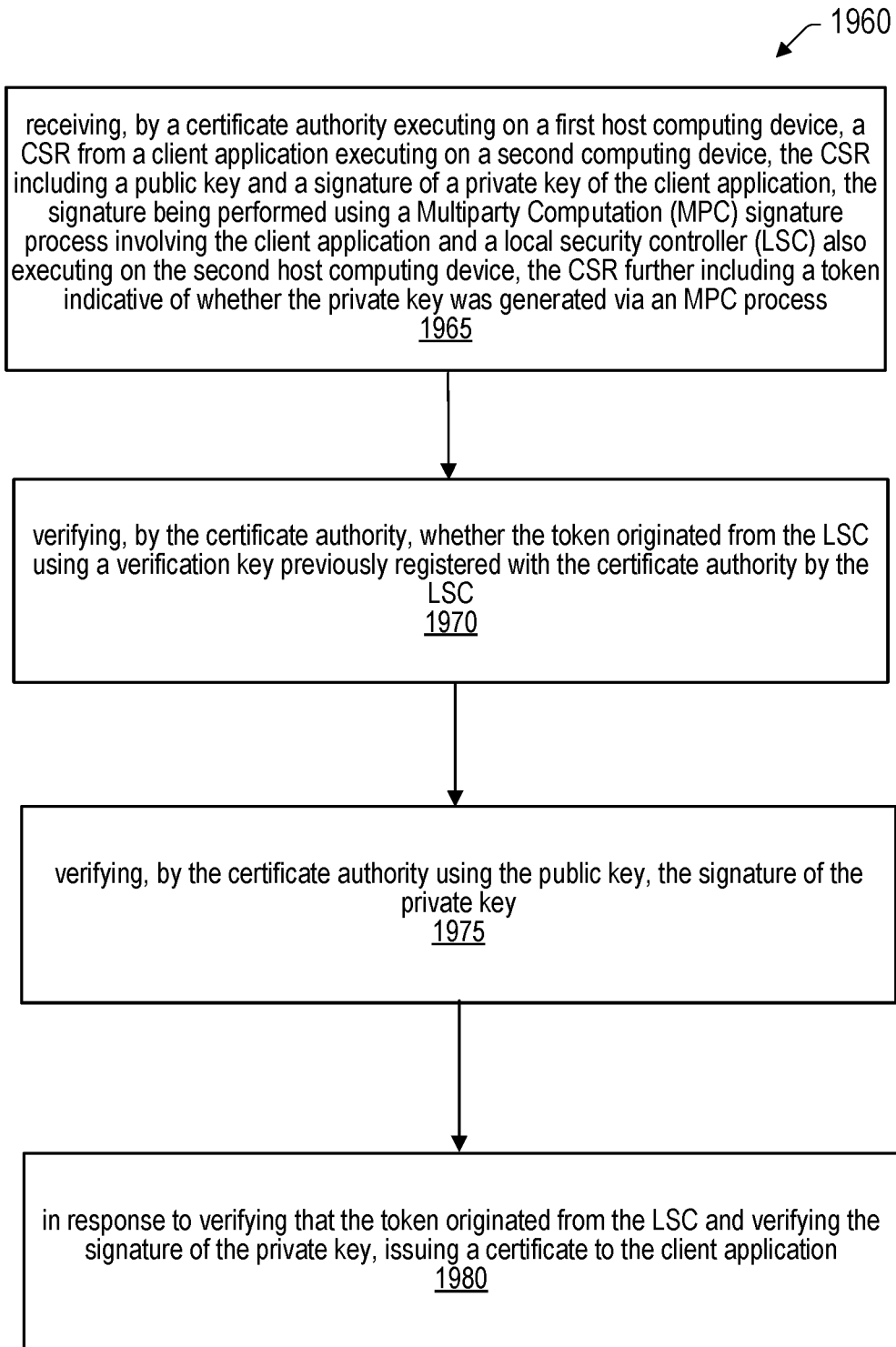
FIG. 19C is a flow diagram of a method 1960 performed by a certificate authority (the RSC in some embodiments) for issuing a certificate in response to a CSR.

Operations associated with the embodiments of FIGS. 16-17 and 18A-C are now summarized with respect to FIGS. 19A-C.

FIG. 19A is a flow diagram of one embodiment of a method 1900 performed by a client application for generating a split private key in conjunction with an LSC. Method 1900 commences in 1905, in which a client application performs a Multiparty Computation (MPC) key generation process on a first host computing device to generate a first fragment of a private key. (A local security controller (LSC) performing the MPC key generation process on the first host computing device in conjunction with the client application generates a second fragment of the private key.)

In 1910, the client application generates a certificate signing request (CSR) that includes a public key corresponding to the private key. The CSR includes a first signature produced by an MPC signature process involving the client application and the LSC using the first and second fragments of the private key. The CSR also includes a token returned by the LSC in response to a determination that the private key corresponding to the CSR was generated via an MPC process. Method 1900 concludes in 1920, with the client application sending the CSR to a certificate authority in an attempt to have a certificate issued.

FIG. 19B is a flow diagram of a method 1930 performed by an LSC for generating a split private key in conjunction with a client application. Method 1930 commences in 1935, in which a local security controller (LSC) performs a Multiparty Computation (MPC) key generation process on a first host computing device to generate a second fragment of a private key. (A client application performing the MPC key generation process on the first host computing device in conjunction with the LSC generates a first fragment of the private key.)

In 1940, the LSC receives, from the client application, a certificate signing request (CSR) that includes a public key corresponding to the private key. In 1945, the LSC, in response to determining that the private key was generated by the LSC and the client application via an MPC process, returns a token to the client application in response to the CSR. The token is verifiable by a certificate authority as originating from the LSC when determining whether to issue a certificate in response to the CSR.

FIG. 19C is a flow diagram of a method 1960 performed by a certificate authority (the RSC in some embodiments) for issuing a certificate in response to a CSR such as those CSRs generated as described with respect to FIGS. 19A-B.

Method 1960 commences in 1965, in which a certificate authority executing on a first host computing device receives a CSR from a client application executing on a second host computing device. The CSR includes a public key and a signature of a private key of the client application; the signature is performed using a Multiparty Computation (MPC) signature process involving the client application and a local security controller (LSC) also executing on the second host computing device. The CSR further includes a token indicative of whether the private key was generated via an MPC process.

In 1970, the certificate authority verifies whether the token originated from the LSC using a verification key previously registered with the certificate authority by the LSC. In 1975, the certificate authority verifies the signature of the private key using the public key. Finally, in 1980, the certificate authority issues a certificate to the client application in response to verifying that the token originated from the LSC and verifying the signature of the private key.

When deploying the embodiments of the present disclosure, the RSC will generally be an application of its own, and often will be considered to be a foundational application that has to be set up whenever a new data center is being provisioned. That is, a data center would not be considered to be ready to host applications and services unless the RSC application is in place. Similarly, an LSC process will be running on every physical node or KUBERNETES node that needs to have access to private keys.

Prior to starting a client application, another process provisions resources for it. Such processes, in one implementation, are referred to as init containers. In the context of the embodiments of this section, an init container can be used to help the client application generate its private key using MPC, obtain the certificate, and then start the application. More broadly, for purposes of this disclosure, references to a client application performing some action include actions performed by helper processes such as init containers, etc.

This disclosure has described three general models for protecting private keys. To recap, in Model 1 (described in the section entitled "Remote, Multi-Node Security Controller"), private key generation is performed at a security controller that is fully remote from the client application, and key signatures are performed by the security controller and the client application. In Model 2 (described in the section entitled "Security Controller with Remote and Local Components"), private key generation is performed at a remote security controller, and key signatures are performed by a local security controller and the client application. In Model 3 (described in the section entitled "Local Private Key Generation Using MPC"), private key generation and key signatures are both performed locally by the local security controller and the client application; the remote security controller acts as a certificate authority.

There are various tradeoffs between these models. Model 1 offers perhaps the strongest security, as the parties in the MPC system are not only split but physically separated—this provides an additional level of protection because of physical isolation in case a malicious actor is able to break operating-system-level constraints. Model 1, however, will have reduced performance (and potentially reduced availability) relative to Models 2 and 3 due to the security controller being fully remote from the client.

Model 2 is arguably less secure than Model 1. But Model 2 offers better availability and performance as there is no dependence on an external server and the chances of a local process dying are much lower than the chance of network congestion or unavailability. The RSC still performs roughly the same amount of work as in Model 1. The security controller in both Models 1 and 2 is in possession of the full private key during key generation; this is addressed in Model 3.

The security, availability, and performance of Model 3 are very close to that of model 2. Model 3 offers some additional advantages such as distributed key generation. The keys are generated by the entities that actually consume them (i.e., use the keys for signatures). With this approach, the load on the RSC is reduced to one signing operation; the key generation aspects are distributed to the host computing devices (which would be numerous in a typical enterprise computing environment). Additionally, the RSC is never in possession of the keys used by the client applications.

One additional potential benefit of Models 1 and 2 is that the RSC can use HSM in high-security mode to generate the key material in accordance with certain government requirements, such as the Federal Information Processing Standards (FIPS).

Each of these three models can have a number of advantages relative to other approaches. These approaches allow system administrators to move away from IP-based network protections, leading to greater scalability. Additionally, the robust protection provided by these paradigms allows certificates used to manage the private keys to last longer. The security measures provided by the disclosed techniques should also result in less lateral movement from compromised host computer systems. Since the disclosed embodiments can be implemented in software, a solution can be written once and then run on the platform of any cloud provider (AWS, AZURE, etc.) without making any changes. Accordingly, the disclosed embodiments represent a solution that is not tied to any single cloud provider. Finally, these techniques promote crypto-agility. There is no dependency on any specific crypto-processors or special hardware. This provides the ability to switch cryptographic algorithms quickly when needed (e.g., a new PQC signature algorithm, new key agreement protocol, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure discusses potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

The various techniques described herein may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

What is claimed is:

1. A method, comprising:
   receiving, at a remote security controller (RSC) executing on a first host computing device, a key generation request for a client application executing on a second host computing device coupled to the first host computing device over a computer network;
   generating, at the RSC, a symmetric key using a key agreement protocol between the RSC and a local security controller (LSC) executing on the second host computing device;
   generating, by the RSC in response to the key generation request, a split private key having 1) a first fragment encrypted using the symmetric key and 2) a second fragment not encrypted using the symmetric key; and
   sending, by the RSC to the second host computing device, the split private key as part of a key generation response; and
   wherein the LSC is executable to decrypt the first fragment by deriving the symmetric key using the key agreement protocol, and wherein the LSC and the client application are executable to perform a Multiparty Computation (MPC) cryptographic operation to digitally sign a data value using the split private key without the client application having access to the symmetric key.

2. The method of claim 1, wherein the key agreement protocol used by the RSC to generate the symmetric key is based on:
   an RSC private key of an RSC key pair that also includes an RSC public key; and
   an LSC public key of an LSC key pair that also includes an LSC private key, the LSC public key being received by the RSC as part of a registration request from the LSC.

3. The method of claim 2, wherein the key generation response includes the RSC public key, and wherein the LSC is executable to decrypt the first fragment by using the key agreement protocol to derive the symmetric key based on:
   the RSC public key; and
   the LSC private key.

4. The method of claim 3, further comprising:
   discarding, by the RSC, the LSC public key after sending the key generation response.

5. The method of claim 1, wherein the key generation response includes a certificate for the client application that is signed by a private root key of the RSC, the certificate including a public key for the client application that is paired with the split private key.

6. The method of claim 1, wherein the RSC is configured to generate a unique symmetric key for each client application on a given host computing device.

7. The method of claim 1, wherein the RSC is implemented within a key management service (KMS) of a computer system.

8. The method of claim 1, wherein the RSC is executable to register LSCs executing on a plurality of host computing devices and to respond to key generation requests from different client applications on a given host computing device.

9. A method, comprising:
   receiving, at a local security controller (LSC), a key generation request from a client application;
   sending, by the LSC, the key generation request to a remote security controller (RSC) executing on a first host computing device, wherein the LSC and the client application are executing on a second host computing device coupled to the first host computing device by a computer network;
   receiving, at the second host computing device, a split private key responsive to the key generation request, the split private key including 1) a first fragment encrypted by the RSC with a symmetric key and 2) a second fragment not encrypted with the symmetric key; and
   wherein the LSC is executable to decrypt the first fragment by deriving the symmetric key using a key agreement protocol with the RSC, and wherein the LSC and the client application are executable to perform a Multiparty Computation (MPC) cryptographic operation to digitally sign a data value on behalf of the client application with the split private key without the client application having access to the symmetric key.

10. The method of claim 9, further comprising the LSC:
    in response to a reset event, generating an LSC ephemeral key pair that includes an LSC ephemeral public key and an LSC ephemeral private key; and
    sending the LSC ephemeral public key to the RSC to use as part of the key agreement protocol to generate the symmetric key.

11. The method of claim 10, further comprising the LSC:
receiving, in response to the key generation request, an RSC ephemeral public key generated as part of an RSC ephemeral key pair that also includes an RSC ephemeral private key used by the RSC as part of the key agreement protocol to generate the symmetric key; and
deriving the symmetric key using the LSC ephemeral private key and the RSC ephemeral public key.

12. The method of claim 10, wherein the reset event is a bootup of the LSC.

13. The method of claim 9, wherein the LSC is executable to derive a unique symmetric key for each of a plurality of client applications executing on the second host computing device.

14. The method of claim 9, further comprising the LSC:
receiving, from the client application, a key signature request that includes the first fragment of the split private key;
decrypting the first fragment using a version of the symmetric key derived by the LSC using the key agreement protocol; and
computing a first partial result from a first MPC cryptographic operation that uses a decrypted version of the first fragment;
wherein the client application is executable to generate a second partial result from a second MPC cryptographic operation that uses the second fragment of the split private key; and
wherein the first and second partial results are combinable to digitally sign a data value on behalf of the client application without the client application having access to the symmetric key.

15. A system, comprising:
a first host computing device having a first processor subsystem and a first memory storing program instructions executable to implement a remote security controller (RSC); and
a second host computing device coupled to the first host computing device over a computer network, the second host computing device having a second processor subsystem and a second memory storing program instructions executable to implement a local security controller (LSC) and a client application;
wherein the RSC is executable, in response to a key generation request for the client application, to:
generate a symmetric key using a key agreement protocol with the LSC;
generate a split private key for the client application, the split private key including 1) a first fragment that is encrypted with the symmetric key, and 2) a second fragment that is not encrypted by the symmetric key; and
distribute the split private key to the second host computing device; and
wherein the LSC and the client application are executable to use the first and second fragments to perform a Multiparty Computation (MPC) operation to sign a digital data value.

16. The system of claim 15, wherein the LSC is executable to:
receive a key signature request from the client application to use the split private key to sign the digital data value;
derive the symmetric key using the key agreement protocol;
decrypt the first fragment with the derived symmetric key; and
generate a first partial MPC signature using the decrypted first fragment that is combinable with a second partial MPC signature generated by the client application using the second fragment to form a final MPC signature of the digital data value.

17. The system of claim 15, wherein the LSC is executable to register with the RSC by sending, to the RSC, an LSC public key of an LSC ephemeral key pair that also includes an LSC private key, and wherein the RSC is executable to generate the symmetric key by performing the key agreement protocol using the LSC public key and an RSC private key that is part of an RSC key pair that also includes an RSC public key.

18. The system of claim 17, wherein the RSC is executable to include the RSC public key when distributing the split private key to the second host computing device, and wherein the LSC is executable to derive the symmetric key by performing the key agreement protocol using the RSC public key and the LSC private key.

19. The system of claim 17, wherein the RSC is executable to discard the RSC key pair and the LSC public key after distributing the split private key and the RSC public key to the second host computing device.

20. The system of claim 15, further comprising one or more additional host computing devices coupled to the first host computing device over the computer network and configured to send key generation requests to the RSC and receive split private keys in response thereto, wherein a given additional host computing device has a memory storing program instructions executable by a corresponding processor subsystem to implement an LSC and one or more client applications that sign digital data values for client applications with corresponding split private keys using MPC operations.

* * * * *